(12) United States Patent
Mori

(10) Patent No.: US 9,139,234 B2
(45) Date of Patent: Sep. 22, 2015

(54) VEHICLE-BODY SIDE PART STRUCTURE

(75) Inventor: Takeo Mori, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/359,454

(22) PCT Filed: Nov. 22, 2011

(86) PCT No.: PCT/JP2011/076936
§ 371 (c)(1),
(2), (4) Date: May 20, 2014

(87) PCT Pub. No.: WO2013/076818
PCT Pub. Date: May 30, 2013

(65) Prior Publication Data
US 2014/0333092 A1    Nov. 13, 2014

(51) Int. Cl.
*B60N 99/00* (2006.01)
*B62D 25/20* (2006.01)
*B62D 25/02* (2006.01)

(52) U.S. Cl.
CPC .......... *B62D 25/2036* (2013.01); *B62D 25/025* (2013.01)

(58) Field of Classification Search
CPC .......................... B62D 25/2036; B62D 25/025
See application file for complete search history.

(56) References Cited

U.S. PATENT DOCUMENTS

| 4,572,571 A | * | 2/1986 | Malen | 296/193.07 |
|---|---|---|---|---|
| 4,892,350 A | * | 1/1990 | Kijima | 296/204 |
| 5,127,704 A | * | 7/1992 | Komatsu | 296/204 |
| 5,201,566 A | * | 4/1993 | Mori | 296/192 |
| 5,388,885 A | * | 2/1995 | Warren | 296/203.03 |
| 5,921,618 A | | 7/1999 | Mori et al. | |
| 6,126,219 A | * | 10/2000 | Wilkinson et al. | 296/26.01 |
| 2009/0146457 A1 | | 6/2009 | Kanagai et al. | |
| 2009/0236166 A1 | | 9/2009 | Kowaki et al. | |

FOREIGN PATENT DOCUMENTS

| EP | 1 741 619 | 1/2007 |
|---|---|---|
| JP | 51-44023 | 9/1949 |
| JP | 2-42875 | 3/1990 |
| JP | 3-071981 | 7/1991 |

(Continued)

*Primary Examiner* — Lori L Lyjak
(74) *Attorney, Agent, or Firm* — Finnegan, Henderson, Farabow, Garrett & Dunner, LLP

(57) ABSTRACT

To provide a vehicle-body side part structure that can achieve both weight reduction and collision performance. A side sill 3 is constituted of an outer panel 11, an inner panel 12 located on the inside of the outer panel 11 in the vehicle width direction, and a backup panel 13 located on the inside of the inner panel 12 in the vehicle width direction. A backup panel central bulging portion 50 bulging inward in the vehicle width direction is formed in a central portion in the vehicle longitudinal direction of the backup panel 13, an outer panel bead central portion 22 recessed inward in the vehicle width direction is formed in the outer panel 11, and an inner panel bead central portion 39 recessed outward in the vehicle width direction is formed in the inner panel 12 to increase the rigidity in the vehicle width direction. An inner panel bead end portion 44 recessed outward in the vehicle width direction is formed in the inner panel 12, and a backup panel bead end portion 64 protruding inward in the vehicle width direction is formed in the backup panel 13 to increase the rigidity in the vehicle longitudinal direction.

12 Claims, 16 Drawing Sheets

(56) References Cited

FOREIGN PATENT DOCUMENTS

| JP | 5-7585 | 2/1993 |
|---|---|---|
| JP | 5-262264 | 10/1993 |
| JP | 9-323669 | 12/1997 |
| JP | 2004-314845 | 11/2004 |
| JP | 2007-8398 | 1/2007 |
| JP | 2007-314131 | 12/2007 |
| JP | 2009-227104 | 10/2009 |
| JP | 2011-136621 | 7/2011 |

* cited by examiner

VEHICLE-BODY SIDE PART STRUCTURE

CROSS-REFERENCE TO RELATED APPLICATIONS

This application is a national phase application of International Application No. PCT/JP2011/076936, filed Nov. 22, 2011, the content of which is incorporated herein by reference.

TECHNICAL FIELD

The present invention relates to a side part structure of a vehicle in which a side sill is joined to a center pillar and a floor panel.

BACKGROUND ART

Patent Literature 1 discloses a side part structure of a vehicle which has a reinforcing member that is joined to an inner panel and a floor panel and is inclined inward in the vehicle width direction from the inner panel to the floor panel.

PRIOR ART DOCUMENT

Patent Literature

Patent Literature 1: Japanese Patent Application Publication No. 05-262264 (JP 05-262264 A)

SUMMARY OF THE INVENTION

Problem to be Solved by the Invention

In recent years, the use of high-tensile steel plates is increasing in order to achieve weight reduction of vehicle bodies and to ensure collision performance. However, because a side sill has to cope with various mode of collision including front collision and lateral collision, about a dozen various additional reinforcing members, such as patches and bulkheads, are currently attached to a side sill. Thus, when a reinforcing member as described in Patent Literature 1 is attached, a certain degree of weight reduction and collision performance can be both achieved. However, from the viewpoint of achieving both weight reduction and collision performance, the vehicle-body side part structure that is described in Patent Literature 1 is not satisfactory and there is still a room for improvement.

It is, therefore, an object of the present invention to provide a vehicle-body side part structure which can achieve both weight reduction and collision performance.

Means for Solving the Problem

A vehicle-body side part structure according to the present invention includes: a side sill that includes an outer panel that is located on the outside in a vehicle width direction and extends in a vehicle longitudinal direction and an inner panel that is located on the inside in a vehicle width direction and extends in a vehicle longitudinal direction, the side sill being joined to a center pillar; a floor panel that is joined to a lower portion in a vehicle vertical direction of the side sill; and a reinforcing member that extends from a front end portion to a rear end portion of the side sill beyond at least the center pillar and is joined to the inner panel and the floor panel. A lateral high-rigidity portion that has an increased rigidity in the vehicle width direction is formed in a central portion in the vehicle longitudinal direction of at least one of the side sill and the reinforcing member, and a longitudinal high-rigidity portion that has an increased rigidity in the vehicle longitudinal direction is formed in an end portion in the vehicle longitudinal direction of at least one of the side sill and the reinforcing member.

In the vehicle-body side part structure according to the present invention, a lateral high-rigidity portion and a longitudinal high-rigidity portion are formed in at least one of the side sill and the reinforcing member to increase the rigidity in the vehicle width direction in a central portion in the vehicle longitudinal direction and to increase the rigidity in the vehicle longitudinal direction in end portions in the vehicle longitudinal direction. It is, therefore, possible to improve the collision performance against various modes of collision including lateral collision and front collision while achieving weight reduction.

In the present invention, a first outer panel recessed portion that is recessed toward the inner panel may be formed in a central portion in the vehicle longitudinal direction of the outer panel, and a first inner panel recessed portion that is recessed toward the outer panel may be formed in a central portion in the vehicle longitudinal direction of the inner panel.

When the first outer panel recessed portion is formed in the outer panel as described above, the rigidity in the vehicle width direction in a central portion in the vehicle longitudinal direction can be enhanced. Also, when the first inner panel recessed portion is formed in the inner panel, the rigidity in the vehicle width direction in a central portion in the vehicle longitudinal direction can be enhanced. Thus, the first inner panel recessed portion functions as a lateral high-rigidity portion. When a lateral high-rigidity portion is formed in the outer panel and the inner panel, which are major components of the side sill, simplification and weight reduction of the vehicle-body side part structure can be achieved.

In the present invention, the first outer panel recessed portion and the first inner panel recessed portion may be located in such locations that the first outer panel recessed portion is brought into abutting contact with the first inner panel recessed portion when the outer panel is pulled upward in the vehicle vertical direction and inward in the vehicle width direction.

At the time of a lateral-collision, the outer panel is pulled upward in the vehicle vertical direction and inward in the vehicle width direction by the center pillar. Thus, when the first inner panel recessed portion and the first outer panel recessed portion are located as described above, the outer panel can be prevented from being deformed because the first outer panel recessed portion is inhibited from moving upward in the vehicle vertical direction and inward in the vehicle width direction by the first inner panel recessed portion at the time of a lateral collision.

In the present invention, the first inner panel recessed portion may be located above the first outer panel recessed portion in the vehicle vertical direction.

When the first inner panel recessed portion and the first outer panel recessed portion are located as described above, it is ensured that the first outer panel recessed portion is brought into abutting contact with the first inner panel recessed portion when the outer panel is pulled upward in the vehicle vertical direction at the time of a lateral collision.

In the present invention, an upper surface in the vehicle vertical direction of the first outer panel recessed portion may be a slope that faces inward in the vehicle width direction, and a lower surface in the vehicle vertical direction of the first inner panel recessed portion may be a slope that faces outward in the vehicle width direction.

When the first inner panel recessed portion and the first outer panel recessed portion are formed as described above, the lower surface in the vehicle vertical direction of the first inner panel recessed portion can be opposed to the upper surface in the vehicle vertical direction of the first outer panel recessed portion. Thus, because the lower surface in the vehicle vertical direction of the first inner panel recessed portion and the upper surface in the vehicle vertical direction of the first outer panel recessed portion can be brought into face-to-face contact at the time of a lateral collision, the first outer panel recessed portion can be effectively inhibited from moving upward in the vehicle vertical direction and inward in the vehicle width direction.

In addition, because the lower surface in the vehicle vertical direction of the first inner panel recessed portion is located on the inside in the vehicle width direction of the upper surface in the vehicle vertical direction of the first outer panel recessed portion, it is ensured that the first outer panel recessed portion is brought into abutting contact with the first inner panel recessed portion when the outer panel is pulled inward in the vehicle width direction.

In the present invention, the first outer panel recessed portion and the first inner panel recessed portion may extend in the vehicle longitudinal direction with the deepest part formed in a central portion in the vehicle longitudinal direction thereof.

When the first outer panel recessed portion and the first inner panel recessed portion are formed as described above, it is possible to further improve the function as a lateral high-rigidity portion while achieving simplification and weight reduction of the vehicle-body side part structure.

In the present invention, the reinforcing member may have a bulging portion that bulges inward in the vehicle width direction in a central portion in the vehicle longitudinal direction thereof, and a pair of floor cross members that extend in the vehicle width direction may be joined to the vicinity of both end portions in the vehicle longitudinal direction of the bulging portion of the reinforcing member.

When the reinforcing member has a bulging portion in a central portion in the vehicle longitudinal direction thereof and a pair of floor cross members are joined to the vicinity of both end portions in the vehicle longitudinal direction of the bulging portion as described above, the rigidity in the vehicle width direction in a central portion in the vehicle longitudinal direction can be enhanced. Thus, the bulging portion functions as a lateral high-rigidity portion. Because a lateral high-rigidity portion is formed in the reinforcing member as described above, simplification and weight reduction of the vehicle-body side part structure can be achieved.

At the time of a lateral collision, because the center pillar is collapsed inward in the vehicle width direction, the side sill, which is joined to the center pillar, is also deformed in such a manner as to collapse inward in the vehicle width direction. Thus, when a bulging portion is formed in the reinforcing member as described above, the bulging portion can support the side sill from inside in the vehicle width direction and prevents the side sill from collapsing inward in the vehicle width direction inward. As a result, the side sill is prevented from undergoing cross-sectional deformation, and the rigidity of the vehicle body against a lateral collision can be enhanced.

In the present invention, bulging portion may be inclined inward in the vehicle width direction from the location of the junction with the inner panel to the location of the junction with the floor panel.

When the bulging portion is inclined as described above, the side sill can be further prevented from being collapsed inward in the vehicle width direction.

In the present invention, a first closed cross-section may be formed by the inner panel, the reinforcing member and the floor panel.

When a first closed cross-section is formed by the inner panel, the reinforcing member and the floor panel as described above, it is possible to enhance the rigidity in the vehicle longitudinal direction and the vehicle width direction while achieving weight reduction.

In the present invention, a second inner panel recessed portion that is recessed outward in the vehicle width direction and extends in the vehicle longitudinal direction may be formed in at least one of end portions in the vehicle longitudinal direction of the inner panel, a first reinforcing member raised portion that protrudes inward in the vehicle width direction and extends in the vehicle longitudinal direction may be formed in at least one of end portions in the vehicle longitudinal direction of the reinforcing member, and a second closed cross-section may be formed by the second inner panel recessed portion and the first reinforcing member raised portion.

When the second inner panel recessed portion and the first reinforcing member raised portion are formed as described above, the rigidity in the vehicle longitudinal direction and the vehicle width direction in end portions in the vehicle longitudinal direction can be enhanced. In addition, because a second closed cross-section is formed by the second inner panel recessed portion and the first reinforcing member raised portion, the rigidity in the vehicle longitudinal direction and the vehicle width direction in end portions in the vehicle longitudinal direction can be further enhanced. Thus, the second inner panel recessed portion, the first reinforcing member raised portion and the second closed cross-section can be allowed to function as longitudinal high-rigidity portions.

In the present invention, a second reinforcing member raised portion that protrudes inward in the vehicle width direction and extends in the vehicle longitudinal direction may be formed in a lower end portion in the vehicle vertical direction of at least one of end portions in the vehicle longitudinal direction of the reinforcing member, and a third closed cross-section may be formed by the second reinforcing member raised portion, the inner panel and the floor panel.

When the second reinforcing member raised portion is formed as described above, the rigidity in the vehicle longitudinal direction and the vehicle width direction in end portions in the vehicle longitudinal direction can be enhanced. In addition, because a third closed cross-section is formed by the second reinforcing member raised portion, the inner panel and the floor panel, the rigidity in the vehicle longitudinal direction in end portions in the vehicle longitudinal direction can be further enhanced. Thus, the second reinforcing member raised portion and the third closed cross-section can be allowed to function as longitudinal high-rigidity portions.

In addition, because the third closed cross-section enhances the rigidity of the junction between the inner panel and the floor panel, the inner panel can be prevented from being bent relative to the floor panel. Thus, the side sill can be further prevented from being collapsed inward in the vehicle width direction.

In the present invention, the inner panel may include an upper flange portion and a lower flange portion that are joined to the outer panel at an upper portion and a lower portion, respectively, in the vehicle vertical direction thereof, a top wall portion that extends inward in the vehicle width direction from the upper flange portion, a bottom wall portion that extends inward in the vehicle width direction from the lower flange portion, and a side wall portion that is connected to inner end edges in the vehicle width direction of the top wall portion and the bottom wall portion, and the reinforcing member may be joined to the top wall portion and the side wall portion to reinforce the ridge between the top wall portion and the side wall portion.

Because the ridge between the top wall portion and the side wall portion of the inner panel is reinforced by the reinforcing member, the shape-maintaining rigidity of the ridge is increased and the inner panel can be prevented from being deformed.

In the present invention, the strength of the side sill and the reinforcing portion may be higher in an upper part in the vehicle vertical direction than in a lower part in the vehicle vertical direction.

Because a lower part in the vehicle vertical direction does not need to have as high strength as an upper part in the vehicle vertical direction, further weight reduction can be achieved by varying the strength of the side sill and the reinforcing portion in the vehicle vertical direction.

Effect of the Invention

According to the present invention, both weight reduction and collision performance can be achieved.

MODES FOR CARRYING OUT THE INVENTION

Figure 1:
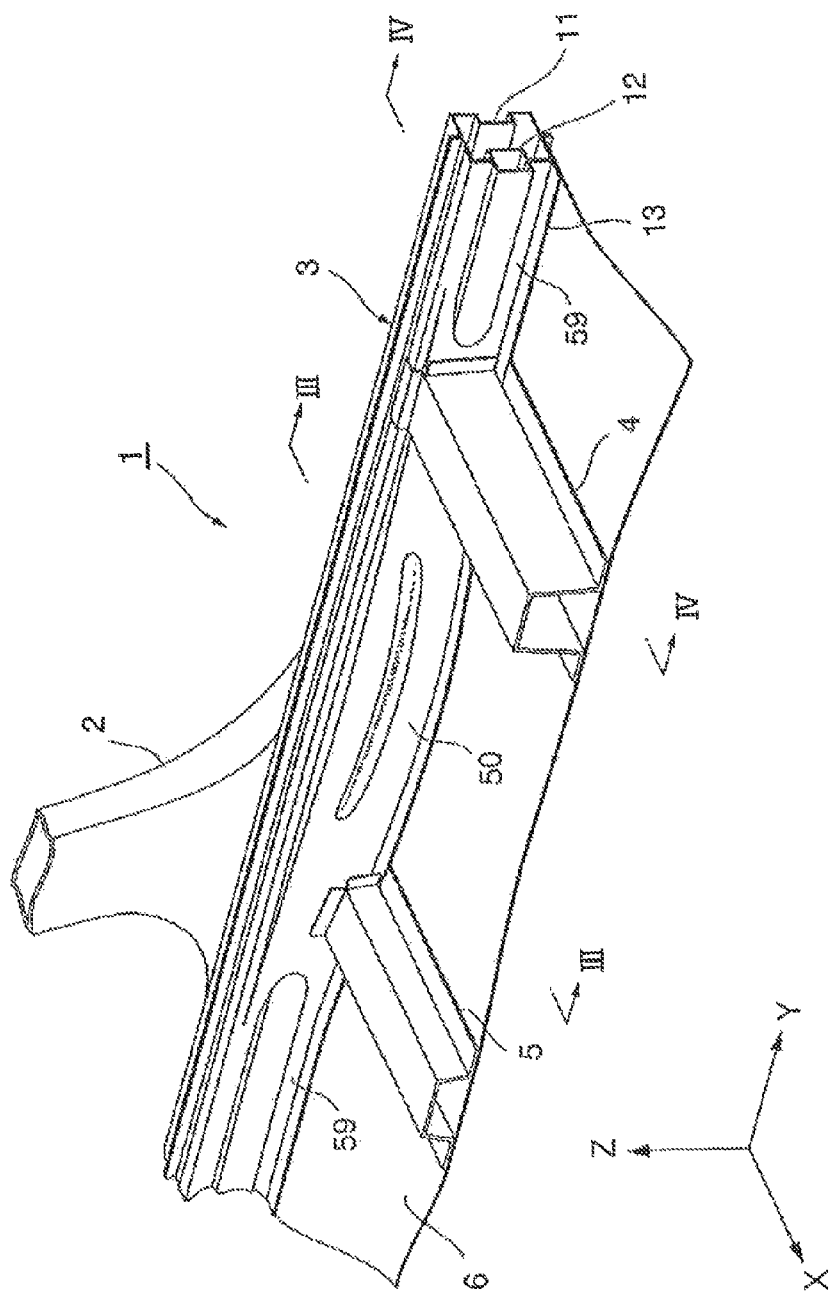
FIG. 1 is a perspective view that illustrates a part of a vehicle-body side part structure according to a first embodiment.

Description is hereinafter made of embodiments of a vehicle-body side part structure according to the present invention with reference to the drawings. In all the drawings, the same or corresponding elements are designated by the same reference numerals and redundant description is omitted. In the following description, the term "vertical direction" refers to a vertical direction in the vehicle vertical direction, and the term "longitudinal direction" refers to a longitudinal direction in the vehicle longitudinal direction.

First Embodiment

Figure 2:
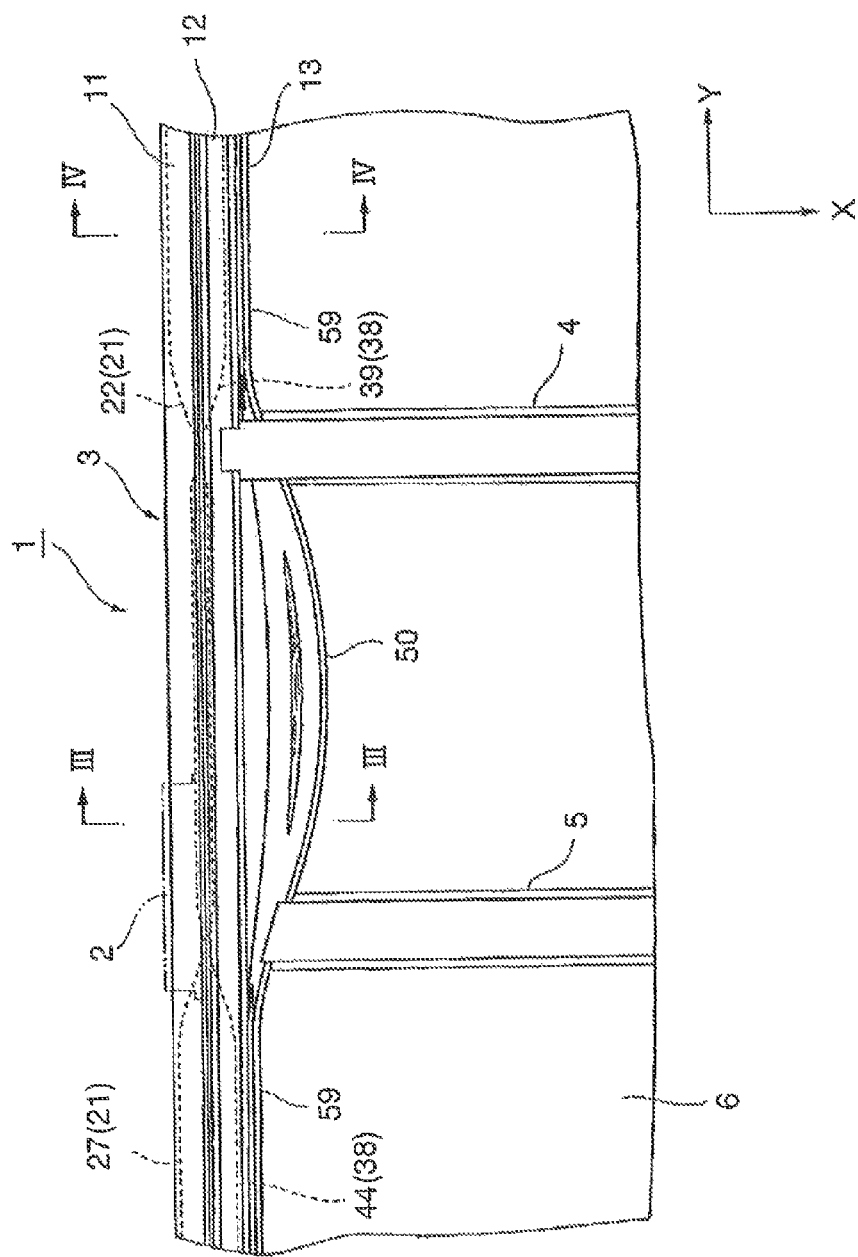
FIG. 2 is a plan view that illustrates a part of the vehicle-body side part structure according to the first embodiment.
Figure 3:
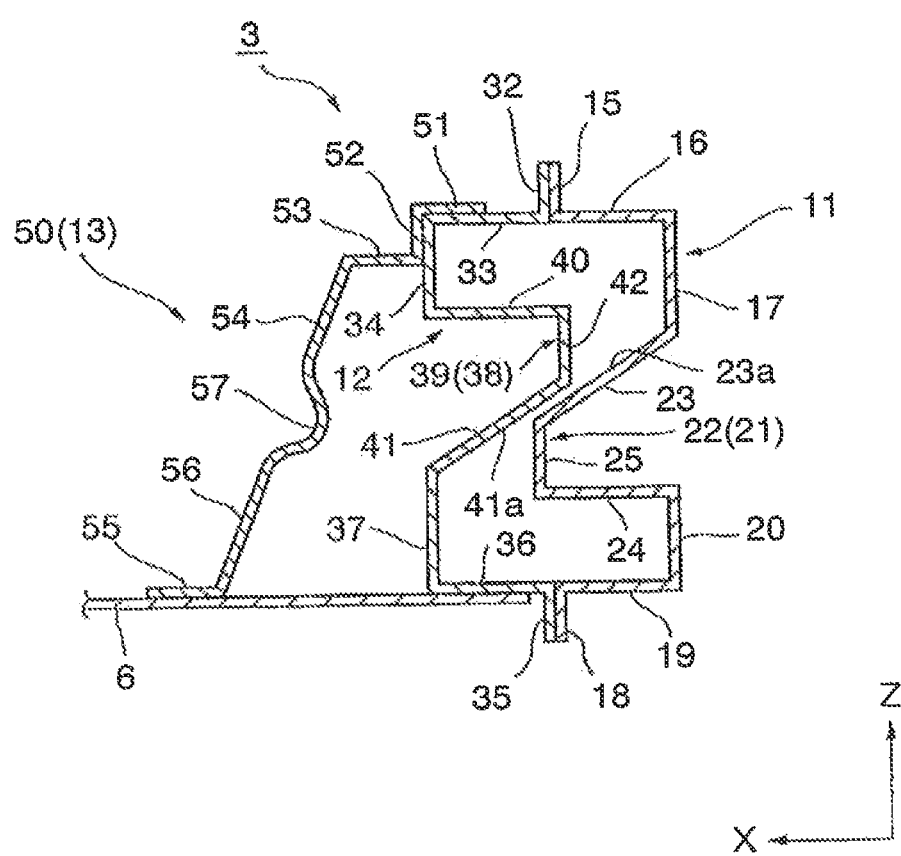
FIG. 3 is a partial cross-sectional view that is taken along the line III-III that is shown in FIG. 1 and FIG. 2.
Figure 4:
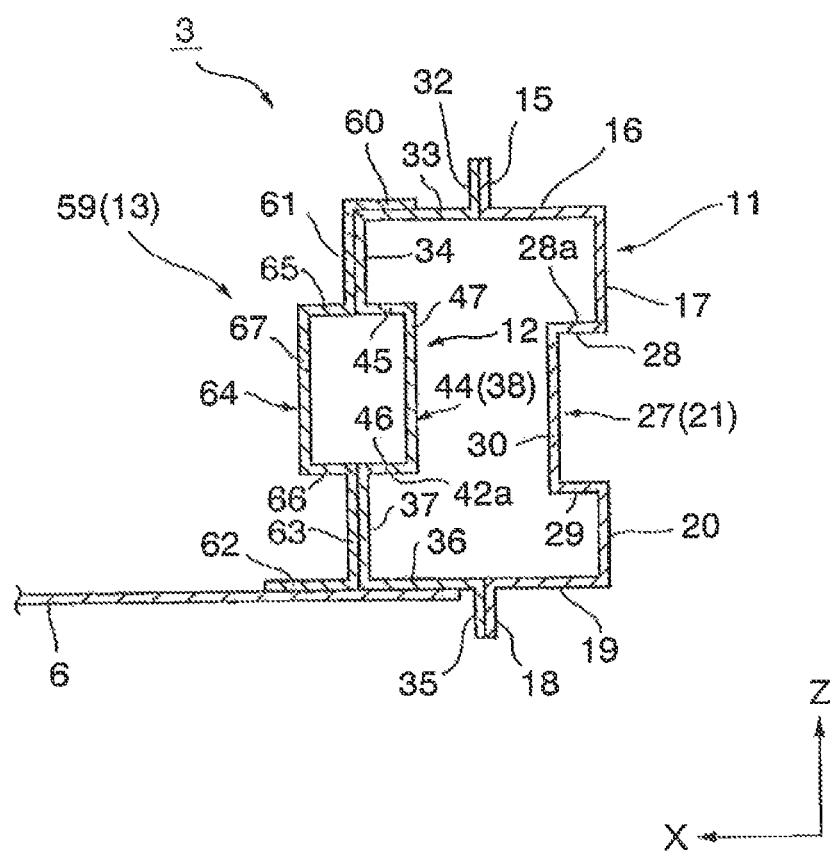
FIG. 4 is a partial cross-sectional view that is taken along the line IV-IV that is shown in FIG. 1 and FIG. 2.

FIG. 1 is a perspective view that illustrates a part of a vehicle-body side part structure according to a first embodiment. FIG. 2 is a plan view that illustrates a part of the vehicle-body side part structure according to the first embodiment. FIG. 3 is a partial cross-sectional view that is taken along the line III-III that is shown in FIG. 1 and FIG. 2. FIG. 4 is a partial cross-sectional view that is taken along the line IV-IV that is shown in FIG. 1 and FIG. 2. In all the drawings, an arrow X indicates the inside (inside of the cabin) in the vehicle width direction, an arrow Y indicates the front side in the vehicle longitudinal direction, and an arrow Z indicates the upper side in the vehicle vertical direction.

As shown in FIG. 1 to FIG. 4, a vehicle-body side part structure 1 according to this embodiment includes a center pillar 2 that is erected in the vehicle vertical direction at a central part in the vehicle longitudinal direction, a side sill 3 that is joined to a lower end portion of the center pillar 2 and extends in the vehicle longitudinal direction, a front floor cross member 4 that extends in the vehicle width direction and is joined to the side sill 3, and a rear floor cross member 5 that is located on the rear side of the front floor cross member 4 in the vehicle longitudinal direction, extends in the vehicle width direction and is joined to the side sill 3. While only the vehicle-body side part structure 1 on the left side of the vehicle is shown in FIG. 1 and FIG. 2, the center pillar 2 and the side sill 3 are also included in the vehicle-body side part structure 1 on the right side of the vehicle.

The center pillar 2 is joined to the outside in the vehicle width direction (outside of the vehicle) of the side sill 3 at a location that is opposed to the rear floor cross member 5 with the side sill 3 therebetween.

The side sill 3 includes an outer panel 11 that is located on the outside in the vehicle width direction of the side sill 3, an inner panel 12 that is located on the inside (inside of the cabin) in the vehicle width direction of the outer panel 11, and a backup panel 13 that is located on the inside in the vehicle width direction of the inner panel 12.

Figure 5:
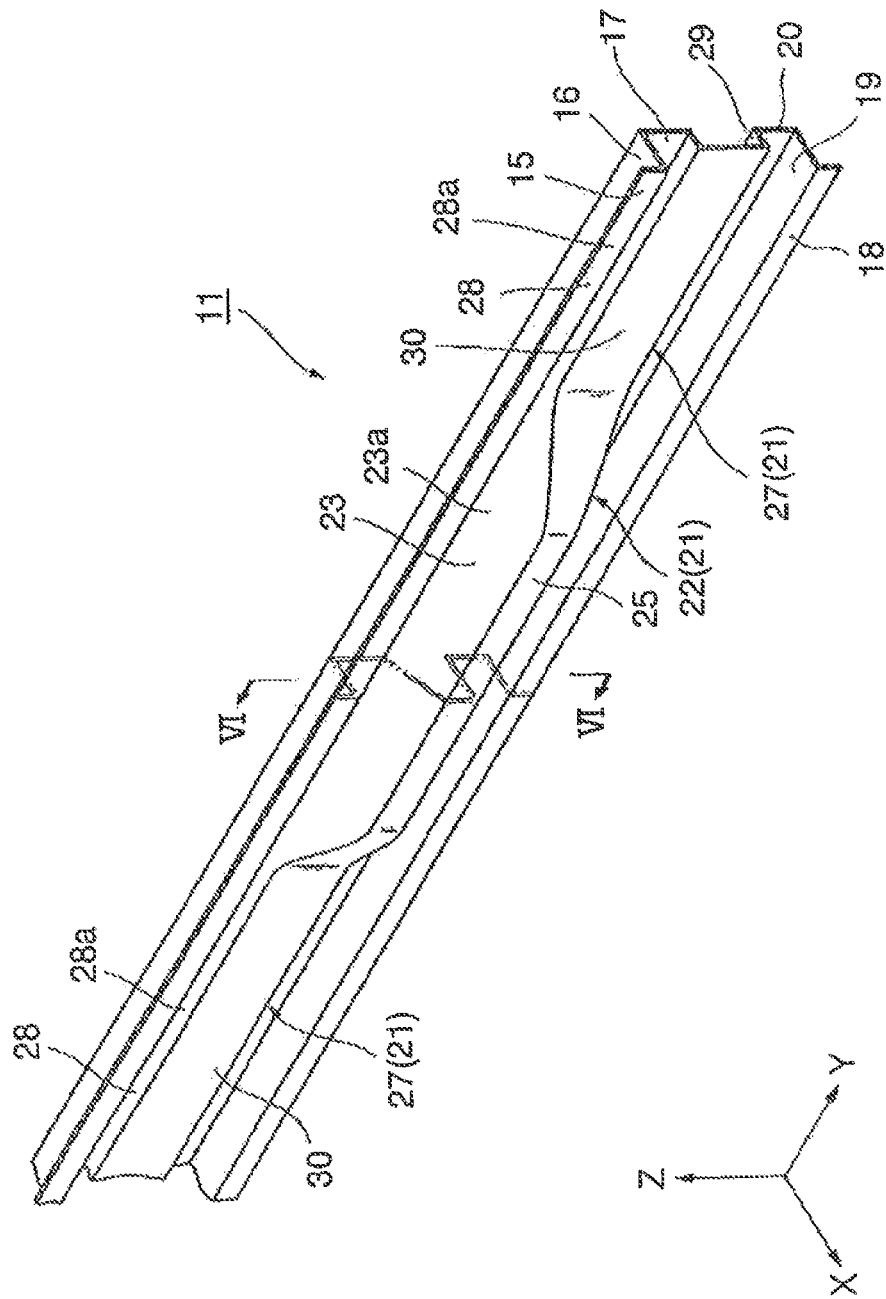
FIG. 5 is a perspective view that illustrates a part of an outer panel.
Figure 6:
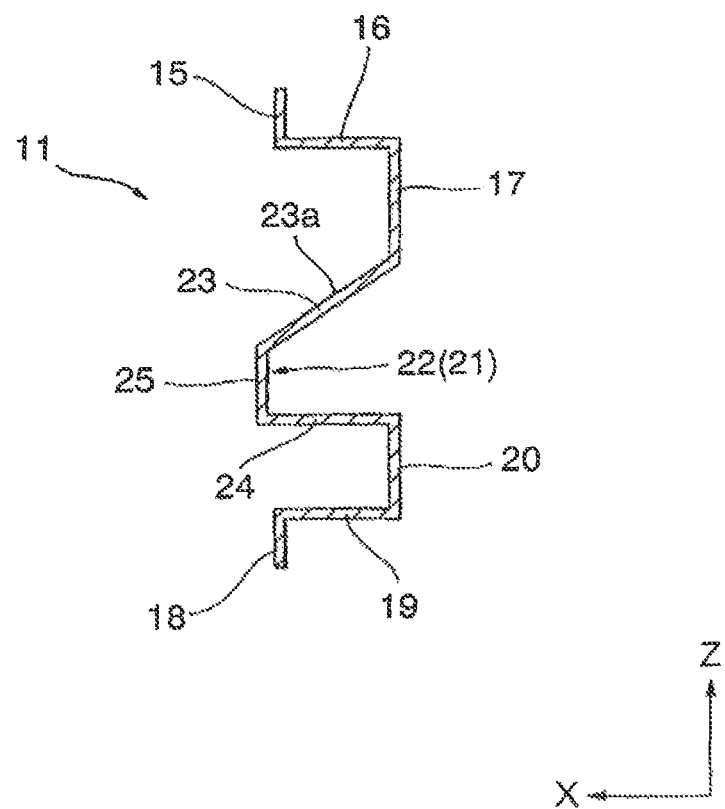
FIG. 6 is a partial cross-sectional view that is taken along the line VI-VI that is shown in FIG. 5.

FIG. 5 is a perspective view that illustrates a part of the outer panel. FIG. 6 is a partial cross-sectional view that is taken along the line VI-VI that is shown in FIG. 5.

As shown in FIG. 1 to FIG. 6, the outer panel 11 extends in the vehicle longitudinal direction, and is joined to the center pillar 2 on the outside in the vehicle width direction. The joint between the outer panel 11 and the center pillar 2 is made by resistance welding, such as spot welding.

The outer panel 11 is formed by bending one steel plate. In other words, the outer panel 11 includes an upper flange portion 15 that is located in an uppermost position in the vehicle vertical direction and extends in the vehicle vertical direction, a top wall portion 16 that extends outward in the vehicle width direction from a lower end edge in the vehicle vertical direction of the upper flange portion 15, an upper side wall portion 17 that extends downward in the vehicle vertical direction from an outer end edge in the vehicle width direction of the top wall portion 16, a lower flange portion 18 that is located in a lowermost position in the vehicle vertical direction and extends in the vehicle vertical direction, a bottom wall portion 19 that extends outward in the vehicle width direction from an upper end edge in the vehicle vertical direction of the lower flange portion 18, a lower side wall portion 20 that extends upward in the vehicle vertical direction from an outer end edge in the vehicle width direction of the bottom wall portion 19, and an outer panel bead portion 21 that is recessed inward in the vehicle width direction (toward the inner panel 12) from a lower end edge in the vehicle vertical direction of the upper side wall portion 17 and an upper end edge in the vehicle vertical direction of the lower side wall portion 20.

Thus, a ridge that extends in the vehicle longitudinal direction is formed between the upper flange portion 15 and the top wall portion 16. A ridge that extends in the vehicle longitudinal direction is formed between the top wall portion 16 and the upper side wall portion 17. A ridge that extends in the vehicle longitudinal direction is formed between the lower flange portion 18 and the bottom wall portion 19. A ridge that extends in the vehicle longitudinal direction is formed between the bottom wall portion 19 and the lower side wall portion 20.

The angle that is formed by the top wall portion 16 and the upper side wall portion 17 is generally a right angle. The angle that is formed by the bottom wall portion 19 and the lower side wall portion 20 is generally a right angle. The top wall portion 16 and the bottom wall portion 19 are located generally parallel to each other. The upper side wall portion 17 and the lower side wall portion 20 are located in a linear arrangement. In reality, the upper side wall portion 17 and the lower side wall portion 20 are formed in the form of one flat plate and the outer panel bead portion 21 is formed by recessing a central portion in the vehicle vertical direction thereof inward in the vehicle width direction.

The outer panel bead portion 21 extends in the vehicle longitudinal direction. The outer panel bead portion 21 includes an outer panel bead central portion 22 that is located at a central part in the vehicle longitudinal direction thereof and extends in the vehicle longitudinal direction, and a pair of outer panel bead end portions 27 that are located at both end portions in the vehicle longitudinal direction of the outer panel bead central portion 22 and extend in the vehicle longitudinal direction. The outer panel bead central portion 22 and the paired outer panel bead end portions 27 are formed in the form of one gutter without joints or level differences.

The outer panel bead central portion 22 of the outer panel bead portion 21 is a portion that is located generally between the front floor cross member 4 and the rear floor cross member 5 (refer to FIG. 2). The outer panel bead central portion 22 includes an outer panel bead upper wall portion 23 that is inclined downward in the vehicle vertical direction and extends inward in the vehicle width direction from a lower end edge in the vehicle vertical direction of the upper side wall portion 17, an outer panel bead lower wall portion 24 that extends inward in the vehicle width direction from an upper end edge in the vehicle vertical direction of the lower side wall portion 20, and an outer panel bead bottom wall portion 25 that is connected to an inner end edge in the vehicle width direction of the outer panel bead upper wall portion 23 and an inner end edge in the vehicle width direction of the outer panel bead lower wall portion 24 and extends in the vehicle vertical direction.

Thus, a ridge that extends in the vehicle longitudinal direction is formed between the upper side wall portion 17 and the outer panel bead upper wall portion 23. A ridge that extends in the vehicle longitudinal direction is formed between the outer panel bead upper wall portion 23 and the outer panel bead bottom wall portion 25. A ridge that extends in the vehicle longitudinal direction is formed between the outer panel bead bottom wall portion 25 and the outer panel bead lower wall portion 24. A ridge that extends in the vehicle longitudinal direction is formed between the outer panel bead lower wall portion 24 and the lower side wall portion 20.

An upper surface 23a of the outer panel bead upper wall portion 23 that faces upward in the vehicle vertical direction is a slope that faces inward in the vehicle width direction. The angle of inclination of the upper surface 23a toward the inside in the vehicle width direction is gradually changed such that it gradually decreases from the center in the vehicle longitudinal direction toward the paired outer panel bead end portions 27. At the connections with the paired outer panel bead end portions 27, the angle of inclination of the upper surface 23a toward the inside in the vehicle width direction is 0°, and the outer panel bead upper wall portion 23 extends only inward in the vehicle width direction from a lower end edge in the vehicle vertical direction of the upper side wall portion 17. The angle that is formed by the outer panel bead bottom wall portion 25 and the outer panel bead lower wall portion 24 is generally a right angle. The angle that is formed by the outer panel bead lower wall portion 24 and the lower side wall portion 20 is generally a right angle.

The depth to which the outer panel bead central portion 22 is recessed inward in the vehicle width direction from the upper side wall portion 17 and the lower side wall portion 20 is largest at the center in the vehicle longitudinal direction. In other words, the recess is deepest at the center in the vehicle longitudinal direction of the outer panel bead central portion 22. The depth is gradually changed such that it gradually decreases toward the paired outer panel bead end portions 27. It should be noted that the depth of the recess may be the same over a prescribed length at a center part in the vehicle longitudinal direction of the outer panel bead central portion 22 as shown in FIG. 5.

As shown in FIG. 4, each outer panel bead end portion 27 of the outer panel bead portion 21 includes an outer panel bead upper wall portion 28 that extends inward in the vehicle width direction from a lower end edge in the vehicle vertical direction of the upper side wall portion 17, an outer panel bead lower wall portion 29 that extends inward in the vehicle width direction from an upper end edge in the vehicle vertical direction of the lower side wall portion 20, and an outer panel bead bottom wall portion 30 that is connected to an inner end edge in the vehicle width direction of the outer panel bead upper wall portion 28 and an inner end edge in the vehicle width direction of the outer panel bead lower wall portion 29 and extends in the vehicle vertical direction.

Thus, a ridge that extends in the vehicle longitudinal direction is formed between the upper side wall portion 17 and the outer panel bead upper wall portion 28. A ridge that extends in the vehicle longitudinal direction is formed between the outer panel bead upper wall portion 28 and the outer panel bead bottom wall portion 30. A ridge that extends in the vehicle longitudinal direction is formed between the outer panel bead bottom wall portion 30 and the outer panel bead lower wall portion 29. A ridge that extends in the vehicle longitudinal direction is formed between the outer panel bead lower wall portion 29 and the lower side wall portion 20.

The angle that is formed by the upper side wall portion 17 and the outer panel bead upper wall portion 28 is generally a right angle. The angle that is formed by the outer panel bead upper wall portion 28 and the outer panel bead bottom wall portion 30 is generally a right angle. The angle that is formed by the outer panel bead bottom wall portion 30 and the outer panel bead lower wall portion 29 is generally a right angle.

Figure 7:
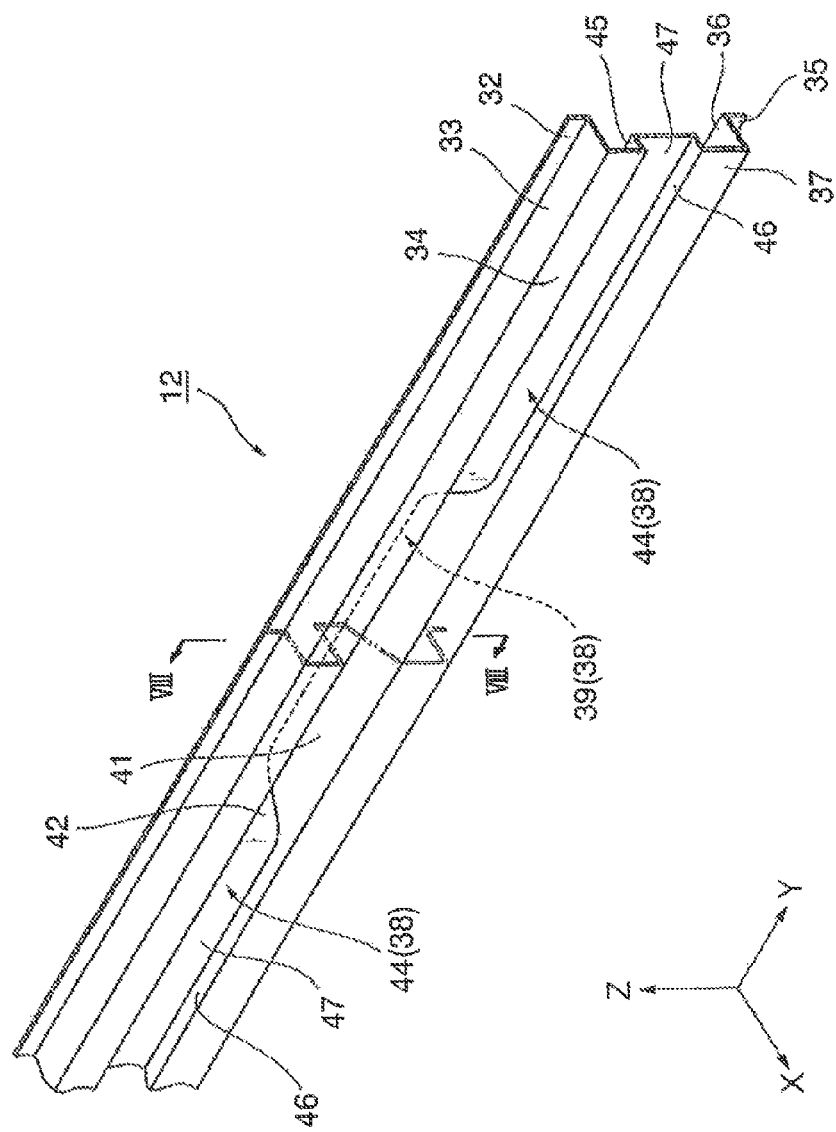
FIG. 7 is a perspective view that illustrates a part of an inner panel.
Figure 8:
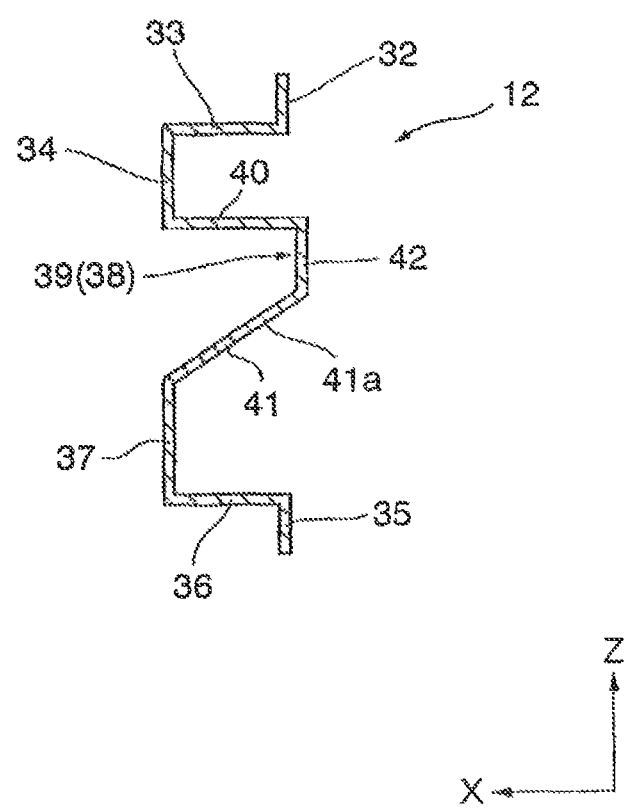
FIG. 8 is a partial cross-sectional view that is taken along the line VIII-VIII that is shown in FIG. 7.

FIG. 7 is a perspective view that illustrates a part of the inner panel. FIG. 8 is a partial cross-sectional view that is taken along the line VIII-VIII that is shown in FIG. 7.

As shown in FIG. 1 to FIG. 4, FIG. 7 and FIG. 8, the inner panel 12 extends in the vehicle longitudinal direction, and is joined to the outer panel 11 on the outside in the vehicle width direction. The joint between the outer panel 11 and the inner panel 12 is made by resistance welding, such as spot welding.

The inner panel 12 is formed by bending one steel plate. In other words, the inner panel 12 includes an upper flange portion 32 that is located in an uppermost position in the vehicle vertical direction and extends in the vehicle vertical direction, a top wall portion 33 that extends inward in the vehicle width direction from a lower end edge in the vehicle vertical direction of the upper flange portion 32, an upper side wall portion 34 that extends downward in the vehicle vertical direction from an inner end edge in the vehicle width direction of the top wall portion 33, a lower flange portion 35 that is located in a lowermost position in the vehicle vertical direction and extends in the vehicle vertical direction, a bottom wall portion 36 that extends inward in the vehicle width direction from an upper end edge in the vehicle vertical direction of the lower flange portion 35, a lower side wall portion 37 that extends upward in the vehicle vertical direction from an inner end edge in the vehicle width direction of the bottom wall portion 36, and an inner panel bead portion 38 that is recessed outward in the vehicle width direction (toward the outer panel 11) from a lower end edge in the vehicle vertical direction of the upper side wall portion 34 and an upper end edge in the vehicle vertical direction of the lower side wall portion 37.

Thus, a ridge that extends in the vehicle longitudinal direction is formed between the upper flange portion 32 and the top wall portion 33. A ridge that extends in the vehicle longitudinal direction is formed between the top wall portion 33 and the upper side wall portion 34. A ridge that extends in the vehicle longitudinal direction is formed between the lower flange portion 35 and the bottom wall portion 36. A ridge that extends in the vehicle longitudinal direction is formed between the bottom wall portion 36 and the lower side wall portion 37.

The angle that is formed by the top wall portion 33 and the upper side wall portion 34 is generally a right angle. The angle that is formed by the bottom wall portion 36 and the lower side wall portion 37 is generally a right angle. The top wall portion 33 and the bottom wall portion 36 are located generally parallel to each other. The upper side wall portion 34 and the lower side wall portion 37 are located in a linear arrangement. In reality, the upper side wall portion 34 and the lower side wall portion 37 are formed in the form of one flat plate and the inner panel bead portion 38 is formed by recessing a central portion in the vehicle vertical direction thereof outward in the vehicle width direction.

The inner panel bead portion 38 extends in the vehicle longitudinal direction. The inner panel bead portion 38 includes an inner panel bead central portion 39 that is located at a central part in the vehicle longitudinal direction thereof and extends in the vehicle longitudinal direction, and a pair of inner panel bead end portions 44 that are located at both end portions in the vehicle longitudinal direction of the inner panel bead central portion 39 and extend in the vehicle longitudinal direction. The inner panel bead central portion 39 and the paired inner panel bead end portions 44 are formed in the form of a gutter without joints or level differences.

The inner panel bead central portion 39 of the inner panel bead portion 38 is, as in the case of the outer panel bead central portion 22, a portion that is located generally between the front floor cross member 4 and the rear floor cross member 5 (refer to FIG. 2). The inner panel bead central portion 39 includes an inner panel bead upper wall portion 40 that extends outward in the vehicle width direction from a lower end edge in the vehicle vertical direction of the upper side wall portion 34, an inner panel bead lower wall portion 41 that is inclined upward in the vehicle vertical direction and extends outward in the vehicle width direction from an upper end edge in the vehicle vertical direction of the lower side wall portion 37, and an inner panel bead bottom wall portion 42 that is connected to an outer end edge in the vehicle width direction of the inner panel bead upper wall portion 40 and an outer end edge in the vehicle width direction of the inner panel bead lower wall portion 41 and extends in the vehicle vertical direction.

Thus, a ridge that extends in the vehicle longitudinal direction is formed between the upper side wall portion 34 and the inner panel bead upper wall portion 40. A ridge that extends in the vehicle longitudinal direction is formed between the inner panel bead upper wall portion 40 and the inner panel bead bottom wall portion 42. A ridge that extends in the vehicle longitudinal direction is formed between the inner panel bead bottom wall portion 42 and the inner panel bead lower wall portion 41. A ridge that extends in the vehicle longitudinal direction is formed between the inner panel bead lower wall portion 41 and the lower side wall portion 37.

A lower surface 41a of the inner panel bead lower wall portion 41 that faces downward in the vehicle vertical direction is a slope that faces outward in the vehicle width direction. The angle of inclination of the lower surface 41a toward the outside in the vehicle width direction is gradually changed such that it gradually decreases from the center in the vehicle longitudinal direction toward the paired inner panel bead end portions 44. At the connections with the paired inner panel bead end portions 44, the angle of inclination of the lower surface 41a toward the outside in the vehicle width direction is 0°, and the inner panel bead lower wall portion 41 extends only outward in the vehicle width direction from a lower end edge in the vehicle vertical direction of the upper side wall portion 34. The angle of inclination of the lower surface 41a of the inner panel bead lower wall portion 41 is generally the same as the angle of inclination of the upper surface 23a of the outer panel bead upper wall portion 23. The angle that is formed by the upper side wall portion 34 and the inner panel bead upper wall portion 40 is generally a right angle. The angle that is formed by the inner panel bead upper wall portion 40 and the inner panel bead bottom wall portion 42 is generally a right angle.

The depth to which the inner panel bead central portion 39 is recessed outward in the vehicle width direction from the upper side wall portion 34 and the lower side wall portion 37 is largest at the center in the vehicle longitudinal direction. In other words, the recess is deepest at the center in the vehicle longitudinal direction of the inner panel bead central portion 39. The depth is gradually changed such that it gradually decreases toward the paired inner panel bead end portions 44. It should be noted that the depth of the recess may be the same over a prescribed length at a center part in the vehicle longitudinal direction of the inner panel bead central portion 39 as shown in FIG. 7.

As shown in FIG. 2, the outer panel bead central portion 22 of the outer panel 11 and the inner panel bead central portion 39 of the inner panel 12 are located in such locations that the outer panel bead central portion 22 is brought into abutting contact with the inner panel bead central portion 39 when the outer panel 11 is pulled upward in the vehicle vertical direction and inward in the vehicle width direction.

Specifically, the upper surface 23a of the outer panel bead upper wall portion 23 of the outer panel bead central portion 22 and the lower surface 41a of the inner panel bead lower wall portion 41 of the inner panel bead central portion 39 are opposed to each other. The lower surface 41a of the inner panel bead lower wall portion 41 is located above the upper surface 23a of the outer panel bead upper wall portion 23 in the vehicle vertical direction, and the upper surface 23a of the outer panel bead upper wall portion 23 and the lower surface 41a of the inner panel bead lower wall portion 41 overlap each other (in the vehicle vertical direction) as seen in a plan view of the vehicle. The lower surface 41a of the inner panel bead lower wall portion 41 is located on the inside of the upper surface 23a of the outer panel bead upper wall portion 23 in the vehicle width direction, and the upper surface 23a of the outer panel bead upper wall portion 23 and the lower surface 41a of the inner panel bead lower wall portion 41 overlap each other as seen in a side view of the vehicle.

As shown in FIG. 4, each inner panel bead end portion 44 of the inner panel bead portion 38 includes an inner panel bead upper wall portion 45 that extends outward in the vehicle width direction from a lower end edge in the vehicle vertical direction of the upper side wall portion 34, an inner panel bead lower wall portion 46 that extends outward in the vehicle width direction from an upper end edge in the vehicle vertical direction of the lower side wall portion 37, and an inner panel bead bottom wall portion 47 that is connected to an outer end edge in the vehicle width direction of the inner panel bead upper wall portion 45 and an outer end edge in the vehicle width direction of the inner panel bead lower wall portion 46 and extends in the vehicle vertical direction.

Thus, a ridge that extends in the vehicle longitudinal direction is formed between the upper side wall portion 34 and the inner panel bead upper wall portion 45. A ridge that extends in the vehicle longitudinal direction is formed between the inner panel bead upper wall portion 45 and the inner panel bead bottom wall portion 47. A ridge that extends in the vehicle longitudinal direction is formed between the inner panel bead bottom wall portion 47 and the inner panel bead lower wall portion 46. A ridge that extends in the vehicle longitudinal direction is formed between the inner panel bead lower wall portion 46 and the lower side wall portion 37.

The angle that is formed by the upper side wall portion 34 and the inner panel bead upper wall portion 45 is generally a right angle. The angle that is formed by the inner panel bead upper wall portion 45 and the inner panel bead bottom wall portion 47 is generally a right angle. The angle that is formed by the inner panel bead bottom wall portion 47 and the inner panel bead lower wall portion 46 is generally a right angle. The angle that is formed by the inner panel bead lower wall portion 46 and the lower side wall portion 37 is generally a right angle.

As shown in FIG. 3 and FIG. 4, the upper flange portion 32 and the lower flange portion 35 of the inner panel 12, which is constituted as described above, are joined to the upper flange portion 15 of the outer panel 11 and the lower flange portion 18 of the outer panel 11, respectively. As a result, a closed cross-section is formed by the outer panel 11 and the inner panel 12.

Figure 9:
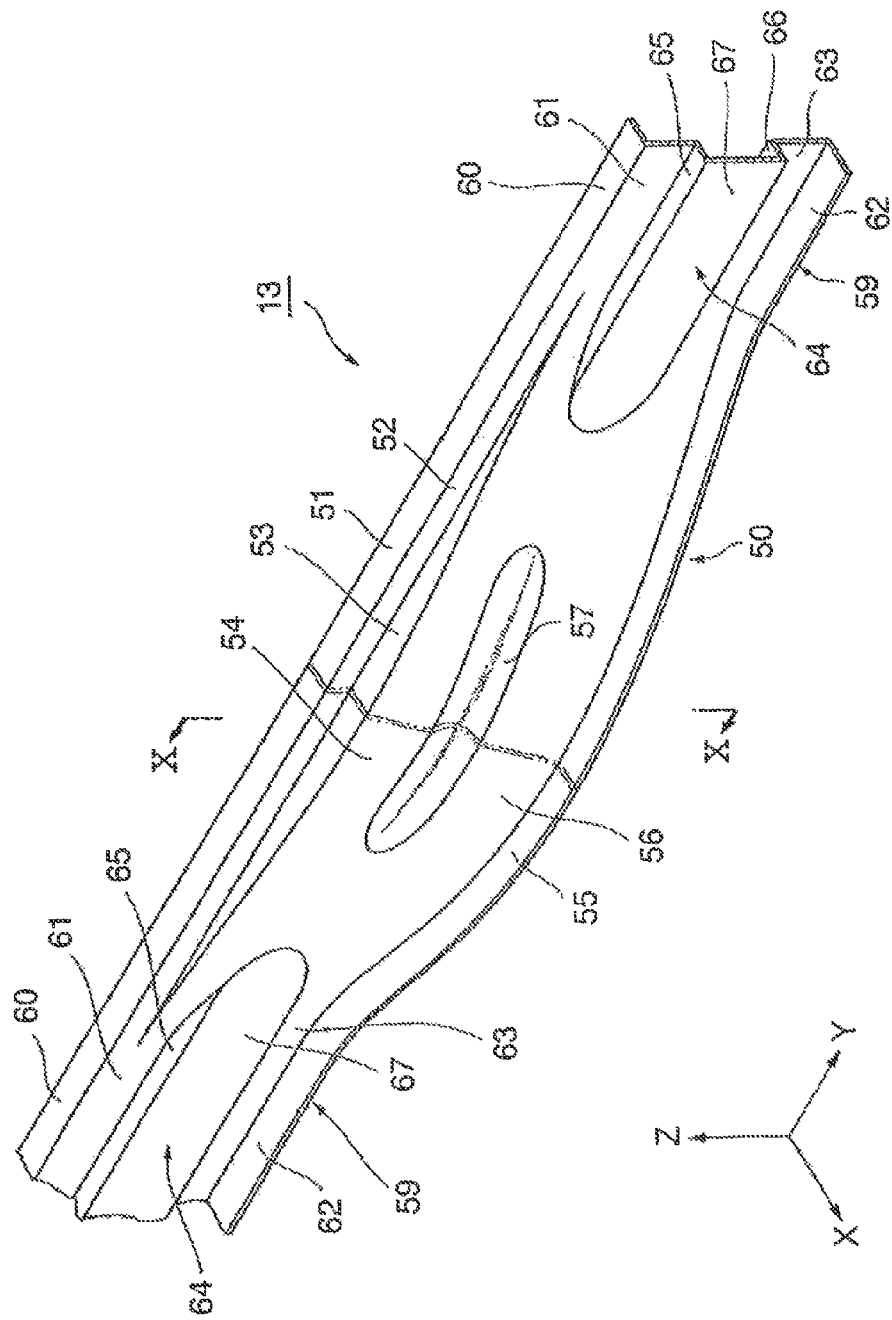
FIG. 9 is a perspective view that illustrates a part of a backup panel.
Figure 10:
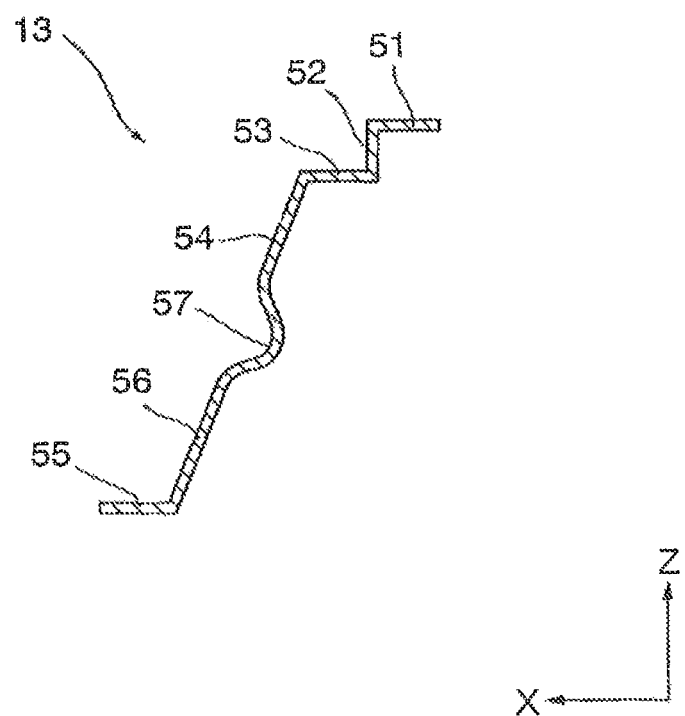
FIG. 10 is a cross-sectional view that is taken along the line x-x that is shown in FIG. 9.

FIG. 9 is a perspective view that illustrates a part of a backup panel. FIG. 10 is a cross-sectional view that is taken along the line x-x that is shown in FIG. 9.

As shown in FIG. 1 to FIG. 4, FIG. 9 and FIG. 10, the backup panel 13 extends in the vehicle longitudinal direction from front ends in the vehicle longitudinal direction to the rear ends in the vehicle longitudinal direction of the outer panel 11 and the inner panel 12. The backup panel 13 is joined to the inner panel 12 on the outside in the vehicle width direction, and is joined to a floor panel 6 on the inside in the vehicle width direction. The joint between the inner panel 12 and the backup panel 13 and the joint between the backup panel 13 and the floor panel are made by resistance welding, such as spot welding.

The backup panel 13 is formed by bending one steel plate. The backup panel 13 includes a backup panel central bulging portion 50 that is located at a central part in the vehicle longitudinal direction thereof, and a pair of backup panel end portions 59 that are located at both end portions in the vehicle longitudinal direction of the backup panel central bulging portion 50. The backup panel central bulging portion 50 is a portion that is located generally between the front floor cross member 4 and the rear floor cross member 5, and is located opposed to the center pillar 2 with the outer panel 11 and the inner panel 12 therebetween. It should be noted that the backup panel central bulging portion 50 may extend forward in the vehicle longitudinal direction beyond the front floor cross member 4 and may extend rearward in the vehicle longitudinal direction beyond the rear floor cross member 5 as long as it is located at least between the front floor cross member 4 and the rear floor cross member 5.

The backup panel central bulging portion 50 of the backup panel 13 includes an upper flange portion 51 that is located in an uppermost position in the vehicle vertical direction and extends in the vehicle width direction, a side wall portion 52 that extends downward in the vehicle vertical direction from an inner end edge in the vehicle width direction of the upper flange portion 51, a large width portion 53 that extends inward in the vehicle width direction from a lower end edge in the vehicle vertical direction of the side wall portion 52, an upper inclined wall portion 54 that is inclined inward in the vehicle width direction and extends downward in the vehicle vertical direction from an inner end edge in the vehicle width direction of the large width portion 53, a lower flange portion 55 that is located in a lowermost position in the vehicle vertical direction and extends in the vehicle width direction, a lower inclined wall portion 56 that is inclined outward in the vehicle width direction and extends upward in the vehicle vertical direction from an outer end edge in the vehicle width direction of the lower flange portion 55, and a backup panel bead central portion 57 that is connected to a lower end edge in the vehicle vertical direction of the upper inclined wall portion 54 and an upper end edge in the vehicle vertical direction of the lower inclined wall portion 56 and is recessed outward in the vehicle width direction.

Thus, a ridge that extends in the vehicle longitudinal direction is formed between the upper flange portion 51 and the side wall portion 52. A ridge that extends in the vehicle longitudinal direction is formed between the side wall portion 52 and the large width portion 53. A ridge that extends in the vehicle longitudinal direction in a curved fashion is formed between the large width portion 53 and the upper inclined wall portion 54. A ridge that extends in the vehicle longitudinal direction in a curved fashion is formed between the upper inclined wall portion 54 and the backup panel bead central portion 57. A ridge that extends in the vehicle longitudinal direction in a curved fashion is formed between the backup panel bead central portion 57 and the lower inclined wall portion 56. A ridge that extends in the vehicle longitudinal direction in a curved fashion is formed between the lower inclined wall portion 56 and the lower flange portion 55.

The angle that is formed by the upper flange portion 51 and the side wall portion 52 is generally a right angle. The angle that is formed by the side wall portion 52 and the large width portion 53 is generally a right angle. The upper inclined wall portion 54 and the lower inclined wall portion 56 are located in a linear arrangement. In reality, the upper inclined wall portion 54 and the lower inclined wall portion 56 are formed in the form of one flat plate and the backup panel bead central portion 57 is formed by recessing a central portion in the vehicle vertical direction thereof outward in the vehicle width direction.

The width to which the large width portion 53 bulges inward in the vehicle width direction from the side wall portion 52 is largest at the center in the vehicle longitudinal direction. In other words, the large width portion 53 bulges inward in the vehicle width direction most significantly at the center in the vehicle longitudinal direction. The width is gradually changed such that it gradually decreases toward the paired backup panel end portions 59. It should be noted that the width to which the large width portion 53 bulges inward in the vehicle width direction may be the same over a prescribed length at a center part in the vehicle longitudinal direction thereof.

The angle of inclination of the upper inclined wall portion 54 and the lower inclined wall portion 56 in the vehicle width direction is gradually changed such that it gradually decreases from the center in the vehicle longitudinal direction toward the paired backup panel end portions 59. At the connections with the paired backup panel end portions 59, the angle of inclination of the upper inclined wall portion 54 and the lower inclined wall portion 56 in the vehicle width direction is 0°, and the upper inclined wall portion 54 extends only downward in the vehicle vertical direction from an inner end edge in the vehicle width direction of the large width portion 53 and the lower inclined wall portion 56 extends only upward in the vehicle vertical direction from an outer end edge in the vehicle width direction of the lower flange portion 55.

The backup panel bead central portion 57 extends in the vehicle longitudinal direction. The backup panel bead central portion 57 may have any shape. While the backup panel bead central portion 57 is formed along only a part of the backup panel central bulging portion 50 in the drawing, the backup panel bead central portion 57 may be formed along the entire portion of the backup panel central bulging portion 50.

As shown in FIG. 3, the upper flange portion 51, the side wall portion 52 and the lower flange portion 55 of the backup panel central bulging portion 50, which is constituted as described above, are joined to the top wall portion 33 of the inner panel 12, the upper side wall portion 34 of the inner panel 12 and the floor panel 6, respectively. Thus, a closed cross-section is formed by the inner panel 12, the backup panel central bulging portion 50 and the floor panel 6. Also, because the backup panel central bulging portion 50 is joined to the inner panel 12 as described above, the ridge between the top wall portion 33 and the upper side wall portion 34 of the inner panel 12 is reinforced by the upper flange portion 51 and the side wall portion 52.

Each backup panel end portion 59 of the backup panel 13 includes an upper flange portion 60 that is located in an uppermost position in the vehicle vertical direction and extends in the vehicle width direction, an upper side wall portion 61 that extends downward in the vehicle vertical direction from an inner end edge in the vehicle width direction of the upper flange portion 60, a lower flange portion 62 that is located in a lowermost position in the vehicle vertical direction and extends in the vehicle width direction, a lower side wall portion 63 that extends upward in the vehicle vertical direction from an outer end edge in the vehicle width direction of the lower flange portion 62, and a backup panel bead end portion 64 that is connected to a lower end edge in the vehicle vertical direction of the upper side wall portion 61 and an upper end edge in the vehicle vertical direction of the lower side wall portion 63 and protrudes inward in the vehicle width direction.

Thus, a ridge that extends in the vehicle longitudinal direction is formed between the upper flange portion 60 and the upper side wall portion 61. A ridge that extends in the vehicle longitudinal direction is formed between the lower flange portion 62 and the lower side wall portion 63.

The angle that is formed by the upper flange portion 60 and the upper side wall portion 61 is generally a right angle. The angle that is formed by the lower flange portion 62 and the lower side wall portion 63 is generally a right angle. The upper side wall portion 61 and the lower side wall portion 63 are located in a linear arrangement. In reality, the upper inclined wall portion 54 and the lower inclined wall portion 56 are formed in the form of one flat plate and the backup panel bead central portion 57 is formed by recessing a central portion in the vehicle vertical direction thereof outward in the vehicle width direction. The upper flange portion 60 of the backup panel end portion 59 is coupled to the upper flange portion 51 of the backup panel central bulging portion 50, the upper side wall portion 61 of the backup panel end portion 59 is coupled to the side wall portion 52, the upper inclined wall portion 54 and the lower inclined wall portion 56 of the backup panel central bulging portion 50, and the lower flange portion 62 of the backup panel end portion 59 is coupled to the lower flange portion 55 of the backup panel central bulging portion 50.

The backup panel bead end portion 64 extends in the vehicle longitudinal direction. While the backup panel bead end portion 64 is formed along the entire portion of each backup panel end portion 59 in the drawing, the backup panel bead end portion 64 may be formed along only a part of each backup panel end portion 59.

The backup panel bead end portion 64 includes a backup panel bead upper wall portion 65 that extends inward in the vehicle width direction from a lower end edge in the vehicle vertical direction of the upper side wall portion 61, a backup panel bead lower wall portion 66 that extends inward in the vehicle width direction from an upper end edge in the vehicle vertical direction of the lower side wall portion 63, and a backup panel bead top wall portion 67 that is connected to an inner end edge in the vehicle width direction of the backup panel bead upper wall portion 65 and an inner end edge in the vehicle width direction of the backup panel bead lower wall portion 66 and extends in the vehicle vertical direction.

Thus, a ridge that extends in the vehicle longitudinal direction is formed between the upper side wall portion 61 and the backup panel bead upper wall portion 65. A ridge that extends in the vehicle longitudinal direction is formed between the backup panel bead upper wall portion 65 and the backup panel bead top wall portion 67. A ridge that extends in the vehicle longitudinal direction is formed between the backup panel bead top wall portion 67 and the backup panel bead lower wall portion 66. A ridge that extends in the vehicle longitudinal direction is formed between the backup panel bead lower wall portion 66 and the lower side wall portion 63.

The angle that is formed by the upper side wall portion 61 and the backup panel bead upper wall portion 65 is generally a right angle. The angle that is formed by the backup panel bead upper wall portion 65 and the backup panel bead top wall portion 67 is generally a right angle. The angle that is formed by the backup panel bead top wall portion 67 and the backup panel bead lower wall portion 66 is generally a right angle. The angle that is formed by the backup panel bead lower wall portion 66 and the lower side wall portion 63 is generally a right angle.

As shown in FIG. 4, the upper flange portion 60, the upper side wall portion 61, the lower side wall portion 63 and the lower flange portion 62 of the backup panel end portion 59, which is constituted as described above, are joined to the top wall portion 33 of the inner panel 12, the upper side wall portion 34 of the inner panel 12, the lower side wall portion 37 of the inner panel 12 and the floor panel 6, respectively. Thus, a closed cross-section is formed by the backup panel bead end portion 64 of the backup panel end portion 59 and the inner panel bead end portion 44 of the inner panel 12. Also, because the backup panel end portion 59 is joined to the inner panel 12 as described above, the ridge between the top wall portion 33 and the upper side wall portion 34 of the inner panel 12 is reinforced by the upper flange portion 60 and the upper side wall portion 61.

As shown in FIG. 1 and FIG. 2, the front floor cross member 4 and the rear floor cross member 5 are joined to the backup panel central bulging portion 50. Specifically, the front floor cross member 4 is joined to a front portion in the vehicle longitudinal direction of the backup panel central bulging portion 50, and the rear floor cross member 5 is joined to a rear portion in the vehicle longitudinal direction of the backup panel central bulging portion 50. The joint between the backup panel central bulging portion 50 and the front floor cross member 4 and the rear floor cross member 5 is made by resistance welding, such as spot welding.

The front floor cross member 4 is formed to have generally the same height as the backup panel central bulging portion 50. On the other hand, the rear floor cross member 5 is formed to have a lower height than the backup panel central bulging portion 50 because it is located under the feet of rear-seat passengers who would occupy the rear seats. For example, the rear floor cross member 5 is formed to have a height that is equal to or lower than a half of the height of the backup panel central bulging portion 50.

The front floor cross member 4 and the rear floor cross member 5 extend in the vehicle width direction from the backup panel central bulging portion 50 on the right side of the vehicle to the backup panel central bulging portion 50 on the left side of the vehicle.

As described above, according to the vehicle-body side part structure 1 of this embodiment, the rigidity in the vehicle width direction and the vehicle longitudinal direction is enhanced by the side sill 3. It is, therefore, possible to improve the collision performance against various modes of collision including lateral collision and front collision while achieving weight reduction.

In other words, because the outer panel bead central portion 22 is formed in the outer panel 11 and the inner panel bead central portion 39 is formed in the inner panel 12 in the vehicle-body side part structure 1, the rigidity in the vehicle width direction in a central portion in the vehicle longitudinal direction can be enhanced.

In the vehicle-body side part structure 1, the outer panel bead central portion 22 and the inner panel bead central portion 39 are located in such locations that the outer panel bead central portion 22 is brought into abutting contact with the inner panel bead central portion 39 when the outer panel 11 is pulled upward in the vehicle vertical direction and inward in the vehicle width direction. Thus, at the time of a lateral collision, because the outer panel bead central portion 22 is inhibited from moving upward in the vehicle vertical direction and inward in the vehicle width direction by the inner panel bead central portion 39, the outer panel 11 is prevented from being deformed.

Specifically, the inner panel bead central portion 39 is located above the outer panel bead central portion 22 in the vehicle vertical direction, and it is, therefore, ensured that the outer panel bead central portion 22 is brought into abutting contact with the inner panel bead central portion 39 when the outer panel 11 is pulled upward in the vehicle vertical direction.

In addition, because the upper surface 23a of the outer panel bead central portion 22 is a slope that faces inward in the vehicle width direction and because the lower surface 41a of the inner panel bead central portion 39 is a slope that faces outward in the vehicle width direction, the upper surface 23a and the lower surface 41a can be opposed to each other. Thus, because the upper surface 23a and the lower surface 41a can be brought into face-to-face contact at the time of a lateral collision, the outer panel bead central portion 22 can be effectively inhibited from moving upward in the vehicle vertical direction and inward in the vehicle width direction to further prevent rotational displacement of the side sill 3.

In addition, the lower surface 41a of the inner panel bead central portion 39 is located on the inside in the vehicle width direction of the upper surface 23a of the outer panel bead central portion 22, and it is, therefore, ensured that the outer panel bead central portion 22 is brought into abutting contact with the inner panel bead central portion 39 when the outer panel 11 is pulled inward in the vehicle width direction.

In the vehicle-body side part structure 1, the outer panel bead central portion 22 and the inner panel bead central portion 39 extend in the vehicle longitudinal direction and their deepest parts are formed at the center in the vehicle longitudinal direction. It is, therefore, possible to enhance the rigidity in the vehicle width direction in a central portion in the vehicle longitudinal direction while achieving simplification and weight reduction of the vehicle-body side part structure.

In the vehicle-body side part structure 1, the outer panel bead end portions 27, which extend in the vehicle longitudinal direction, are formed in the outer panel 11 and the inner panel bead end portions 44, which extend in the vehicle longitudinal direction, are formed in the inner panel 12. Thus, the rigidity in the vehicle longitudinal direction in end portions in the vehicle longitudinal direction can be enhanced.

In the vehicle-body side part structure 1, the backup panel 13 has the backup panel central bulging portion 50 in a central portion in the vehicle longitudinal direction thereof, and the front floor cross member 4 and the rear floor cross member 5 are joined to the vicinity of both end portions in the vehicle longitudinal direction of the backup panel central bulging portion 50. Thus, the rigidity in the vehicle width direction in a central portion in the vehicle longitudinal direction can be enhanced. In addition, at the time of a lateral collision, the side sill 3 is prevented from collapsing inward in the vehicle width direction because the backup panel central bulging portion 50 supports the side sill 3 from inside in the vehicle width direction. As a result, the side sill 3 is prevented from undergoing cross-sectional deformation, and the rigidity of the vehicle body against a lateral collision can be enhanced.

In the vehicle-body side part structure 1, the backup panel central bulging portion 50 is inclined. Thus, the side sill 3 is further prevented from collapsing inward in the vehicle width direction.

In the vehicle-body side part structure 1, a first closed cross-section is formed by the inner panel 12, the backup panel central bulging portion 50 and the floor panel 6. Thus, the rigidity in the vehicle longitudinal direction and the vehicle width direction in a central portion in the vehicle longitudinal direction can be enhanced.

In the vehicle-body side part structure 1, second closed cross-sections are formed by the inner panel bead end portions 44, which are formed in the inner panel 12, and the backup panel bead end portions 64, which are formed in the backup panel 13. Thus, the rigidity in the vehicle longitudinal direction and the vehicle width direction in end portions in the vehicle longitudinal direction is enhanced by the second closed cross-sections. In addition, a plurality of ridges that extend in the vehicle longitudinal direction is formed in the inner panel bead end portions 44 and the backup panel bead end portions 64, which form the second closed cross-sections, to increase the number of ridges that extend in the vehicle longitudinal direction. Thus, when there is an input of load in the vehicle longitudinal direction, the input load can be shared by the increased ridges. As a result, the collision performance can be improved.

In the vehicle-body side part structure 1, the ridge between the top wall portion 33 and the upper side wall portion 34 of the inner panel 12 is reinforced by the upper flange portion 51 and the side wall portion 52 of the backup panel central bulging portion 50. Thus, the shape-maintaining rigidity of this ridge is enhanced, and the inner panel 12 can be prevented from being deformed.

In the vehicle-body side part structure 1, the side wall portion 52 is joined to the upper side wall portion 34 of the inner panel 12 and a generally right angle is formed between the side wall portion 52 and the large width portion 53 to form a ridge that extends in the vehicle longitudinal direction between the side wall portion 52 and the large width portion 53 to increase the number of ridges that extend in the vehicle longitudinal direction. Thus, when there is an input of load in the vehicle longitudinal direction, the input load can be shared by the increased ridges. As a result, the collision performance can be improved.

Figure 11:
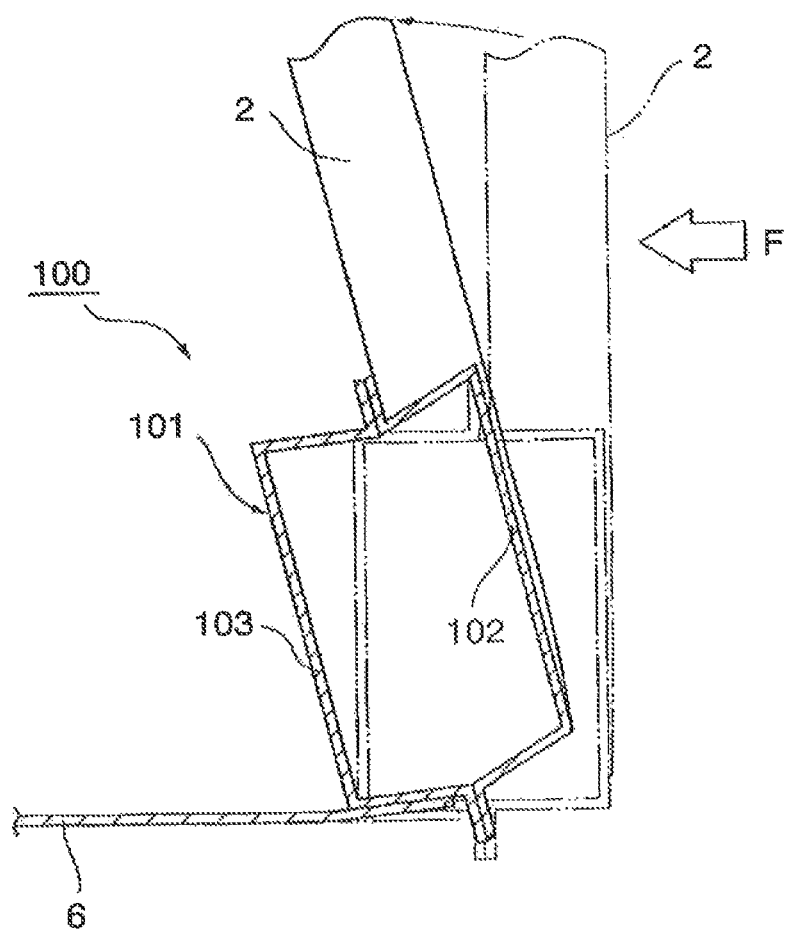
FIG. 11 is a diagram that illustrates how a conventional vehicle-body side part structure is deformed at the time of a lateral collision.
Figure 12:
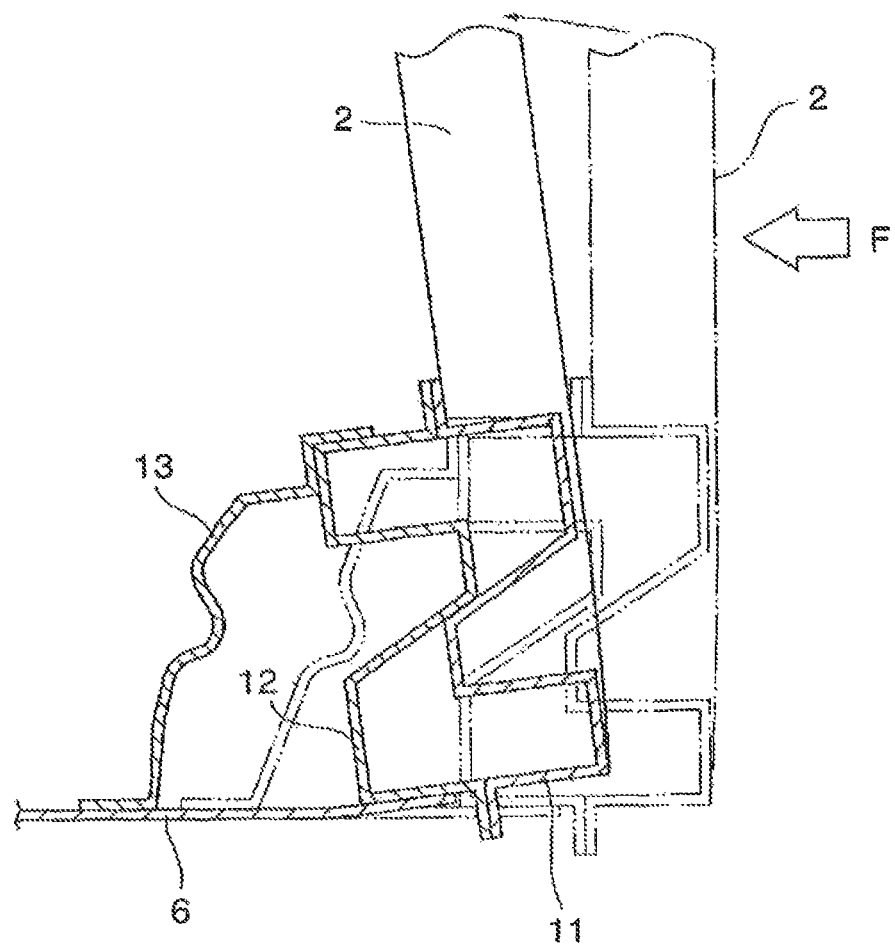
FIG. 12 is a diagram that illustrates how a vehicle-body side part structure according to the first embodiment is deformed at the time of a lateral collision.

Referring now to FIG. 11 and FIG. 12, the state of deformation of the vehicle-body side part structure at the time of a lateral collision is described. FIG. 11 is a diagram that illustrates how a conventional vehicle-body side part structure is deformed at the time of a lateral collision. FIG. 12 is a diagram that illustrates how a vehicle-body side part structure according to the first embodiment is deformed at the time of a lateral collision.

As shown in FIG. 11, a side sill 101 that is used in a conventional vehicle-body side part structure 100 is constituted of an outer panel 102 that is located on the outside in the vehicle width direction and an inner panel 103 that is located on the inside in the vehicle width direction. A rectangular closed cross-section is formed by joining the outer panel 102 and the inner panel 103.

In the conventional vehicle-body side part structure 100, when another vehicle makes a lateral collision on the center pillar 2 of the subject vehicle, a load F that is applied toward the inside in the vehicle width direction from the outside in the vehicle width direction is input into the center pillar 2.

Then, the center pillar 2 is collapsed inward in the vehicle width direction and pulled upward in the vehicle vertical direction by the load F.

Then, the side sill 101, which is joined to the center pillar 2, is significantly deformed upward in the vehicle vertical direction because the outer panel 102 is pulled upward in the vehicle vertical direction by the center pillar 2.

A rear floor cross member 5 is located on the inside in the vehicle width direction of the center pillar 2 with the side sill 101 therebetween. Thus, the rear floor cross member 5 tends to support the side sill 101 from inside in the vehicle width direction when the side sill 101 tends to be collapsed inward in the vehicle width direction. However, the rear floor cross member 5 is lower than the backup panel central bulging portion 50. Thus, the rear floor cross member 5 cannot support the side sill 101 when the side sill 101 tends to be collapsed inward in the vehicle width direction, and the side sill 101 is collapsed inward in the vehicle width direction in a rotating fashion.

Thus, to prevent such deformation in the conventional vehicle-body side part structure 100, it is necessary to attach various additional reinforcing members, such as patches and bulkheads, to the side sill 101.

In contrast, in the vehicle-body side part structure 1 according to this embodiment, the rigidity of the side sill 3 in the vehicle width direction is enhanced by the backup panel central bulging portion 50 of the backup panel 13, the upper inclined wall portion 54 and the lower inclined wall portion 56 of the backup panel central bulging portion 50, the backup panel bead central portion 57 that is formed in the backup panel central bulging portion 50, the outer panel bead central portion 22 of the outer panel bead portion 21 that is formed in the outer panel 11, and the inner panel bead central portion 39 of the inner panel bead portion 38 that is formed in the inner panel 12 as shown in FIG. 12. Thus, the amount of deformation of the side sill 3 can be reduced and the amount of inward collapse of the center pillar 2 in the vehicle width direction can be reduced compared to those in the conventional vehicle-body side part structure 100.

In addition, even if the side sill 3 is deformed in such a manner as to collapse inward in the vehicle width direction, the side sill 3 is prevented from being deformed in such a manner as to collapse inward in the vehicle width direction because the outer panel bead central portion 22 is brought into abutting contact with the inner panel bead central portion 39. Thus, the amount of deformation of the side sill 3 can be further reduced and the amount of inward collapse of the center pillar 2 in the vehicle width direction can be further reduced compared to those in the conventional vehicle-body side part structure 100.

Second Embodiment

Figure 13:
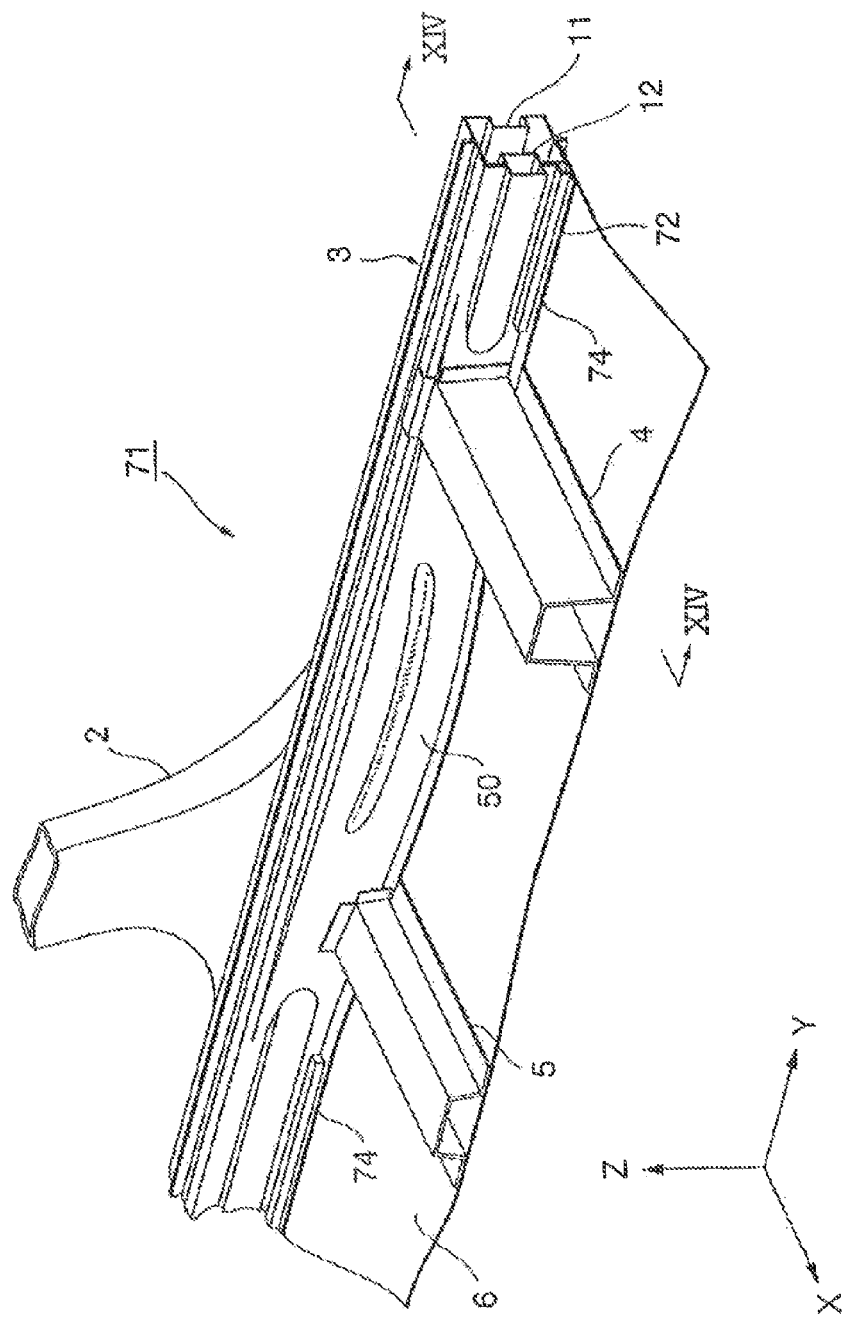
FIG. 13 is a perspective view that illustrates a part of a vehicle-body side part structure according to a second embodiment.
Figure 14:
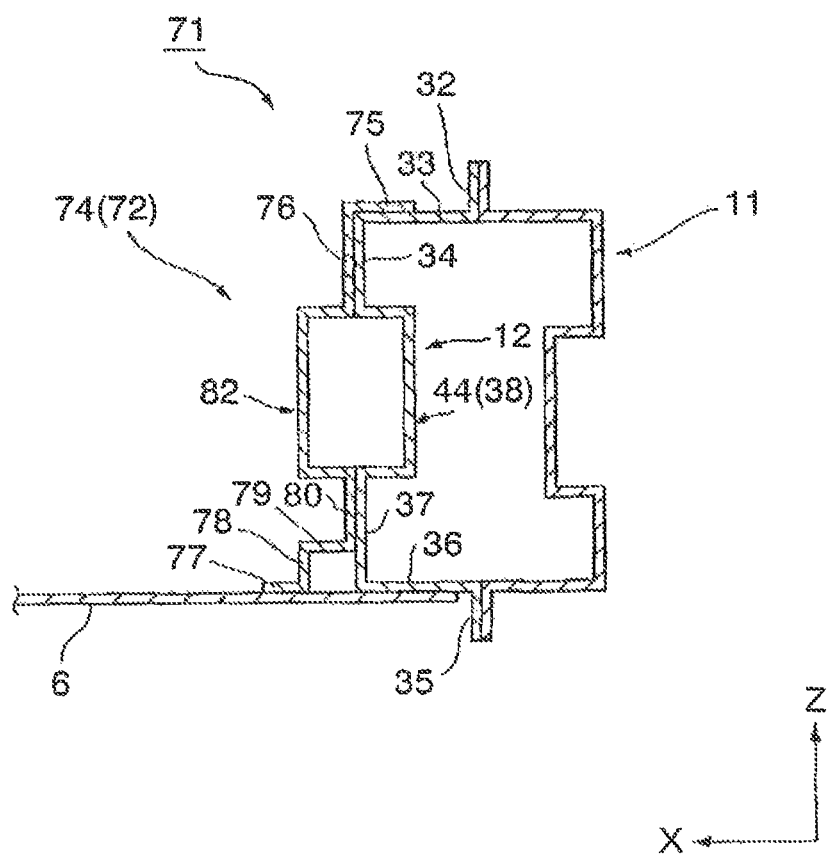
FIG. 14 is a partial cross-sectional view that is taken along the line XIV-XIV that is shown in FIG. 13.

FIG. 13 is a perspective view that illustrates a part of a vehicle-body side part structure according to a second embodiment. FIG. 14 is a partial cross-sectional view that is taken along the line XIV-XIV that is shown in FIG. 13;

As shown in FIG. 13 and FIG. 14, a vehicle-body side part structure 71 according to the second embodiment is essentially the same as the vehicle-body side part structure 1 according to the first embodiment and is different only in the structure of end portions in the vehicle longitudinal direction of the backup panel. Thus, in the following description, only the differences from the first embodiment are described and the description of the same parts as those of the first embodiment is omitted.

A backup panel 72 of the side sill 3 that constitutes the vehicle-body side part structure 71 according to the second embodiment is essentially the same as the backup panel 13 of the side sill 3 that constitutes the vehicle-body side part structure 1 according to the first embodiment, and is different from the vehicle-body side part structure 1 according to the first embodiment only in that the backup panel end portions 59 are changed to backup panel end portions 74.

Each backup panel end portion 74 includes an upper flange portion 75 that is located in an uppermost position in the vehicle vertical direction and extends in the vehicle width direction, an upper side wall portion 76 that extends downward in the vehicle vertical direction from an inner end edge in the vehicle width direction of the upper flange portion 75, a lower flange portion 77 that is located in a lowermost position in the vehicle vertical direction and extends in the vehicle width direction, a lower bead side wall portion 78 that extends upward in the vehicle vertical direction from an outer end edge in the vehicle width direction of the lower flange portion 77, a lower bead top wall portion 79 that extends outward in the vehicle width direction from an upper end edge in the vehicle vertical direction of the lower bead side wall portion 78, a lower side wall portion 80 that extends upward in the vehicle vertical direction from an outer end edge in the vehicle width direction of the lower bead top wall portion 79, and a backup panel bead end portion 82 that is connected to a lower end edge in the vehicle vertical direction of the upper side wall portion 76 and an upper end edge in the vehicle vertical direction of the lower side wall portion 80 and protrudes inward in the vehicle width direction.

Thus, a ridge that extends in the vehicle longitudinal direction is formed between the lower flange portion 77 and the lower bead side wall portion 78. A ridge that extends in the vehicle longitudinal direction is formed between the lower bead side wall portion 78 and the lower bead top wall portion 79. A ridge that extends in the vehicle longitudinal direction is formed between the lower bead top wall portion 79 and the lower side wall portion 80.

The angle that is formed by the upper flange portion 75 and the upper side wall portion 76 is generally a right angle. The angle that is formed by the lower flange portion 77 and the lower bead side wall portion 78 is generally a right angle. The angle that is formed by the lower bead side wall portion 78 and the lower bead top wall portion 79 is generally a right angle. The angle that is formed by the lower bead top wall portion 79 and the lower side wall portion 80 is generally a right angle. Thus, the lower bead side wall portion 78 and the lower bead top wall portion 79 form a bead-like raised portion that protrudes upward in the vehicle vertical direction and inward in the vehicle width direction from the lower flange portion 77 and the lower side wall portion 80.

The lower bead side wall portion 78 and the lower bead top wall portion 79 extend in the vehicle longitudinal direction. While the lower bead side wall portion 78 and the lower bead top wall portion 79 are formed along almost the entire portion of each backup panel end portion 74 in the drawing, the lower bead side wall portion 78 and the lower bead top wall portion 79 may be formed along the entire portion of each backup panel end portion 74. Alternatively, the lower bead side wall portion 78 and the lower bead top wall portion 79 may be formed along only an end portion in the vehicle longitudinal direction of each backup panel end portion 74.

The upper flange portion 75, the upper side wall portion 76, the lower side wall portion 80 and the lower flange portion 77 of the backup panel end portion 74, which is constituted as described above, are joined to the top wall portion 33 of the inner panel 12, the upper side wall portion 34 of the inner panel 12, the lower side wall portion 37 of the inner panel 12, and the floor panel 6, respectively. Thus, a closed cross-section is formed by the backup panel bead end portion 82 of the backup panel end portion 74 and the inner panel bead end portion 44 of the inner panel 12, and a closed cross-section is formed by the lower bead side wall portion 78 and the lower bead top wall portion 79 of the backup panel end portion 74, the lower side wall portion 37 of the inner panel 12 and the floor panel 6. Also, because the backup panel end portion 74 is joined to the inner panel 12 as described above, the ridge between the top wall portion 33 and the upper side wall portion 34 of the inner panel 12 is reinforced by the upper flange portion 75 and the upper side wall portion 76.

As described above, according to the vehicle-body side part structure 71 of the second embodiment, third closed cross-sections are formed by the lower bead side wall portions 78 and the lower bead top wall portions 79 of the backup panel end portions 74, the lower side wall portion 37 of the inner panel 12 and the floor panel 6. Thus, the rigidity in the vehicle longitudinal direction and the vehicle width direction in end portions in the vehicle longitudinal direction can be enhanced. In addition, a plurality of ridges that extend in the vehicle longitudinal direction is formed along the lower bead side wall portions 78 and the lower bead top wall portions 79 of the backup panel end portions 74 that form the third closed cross-sections to increase the number of ridges that extend in the vehicle longitudinal direction. Thus, when there is an input of load in the vehicle longitudinal direction, the input load can be shared by the increased ridges. As a result, the collision performance can be improved.

In addition, because the closed cross-sections enhances the rigidity of the junction between the inner panel 12 and the floor panel 6, the inner panel 12 can be prevented from being bent relative to the floor panel 6. Thus, the side sill 3 can be further prevented from being collapsed inward in the vehicle width direction.

Third Embodiment

Figure 15:
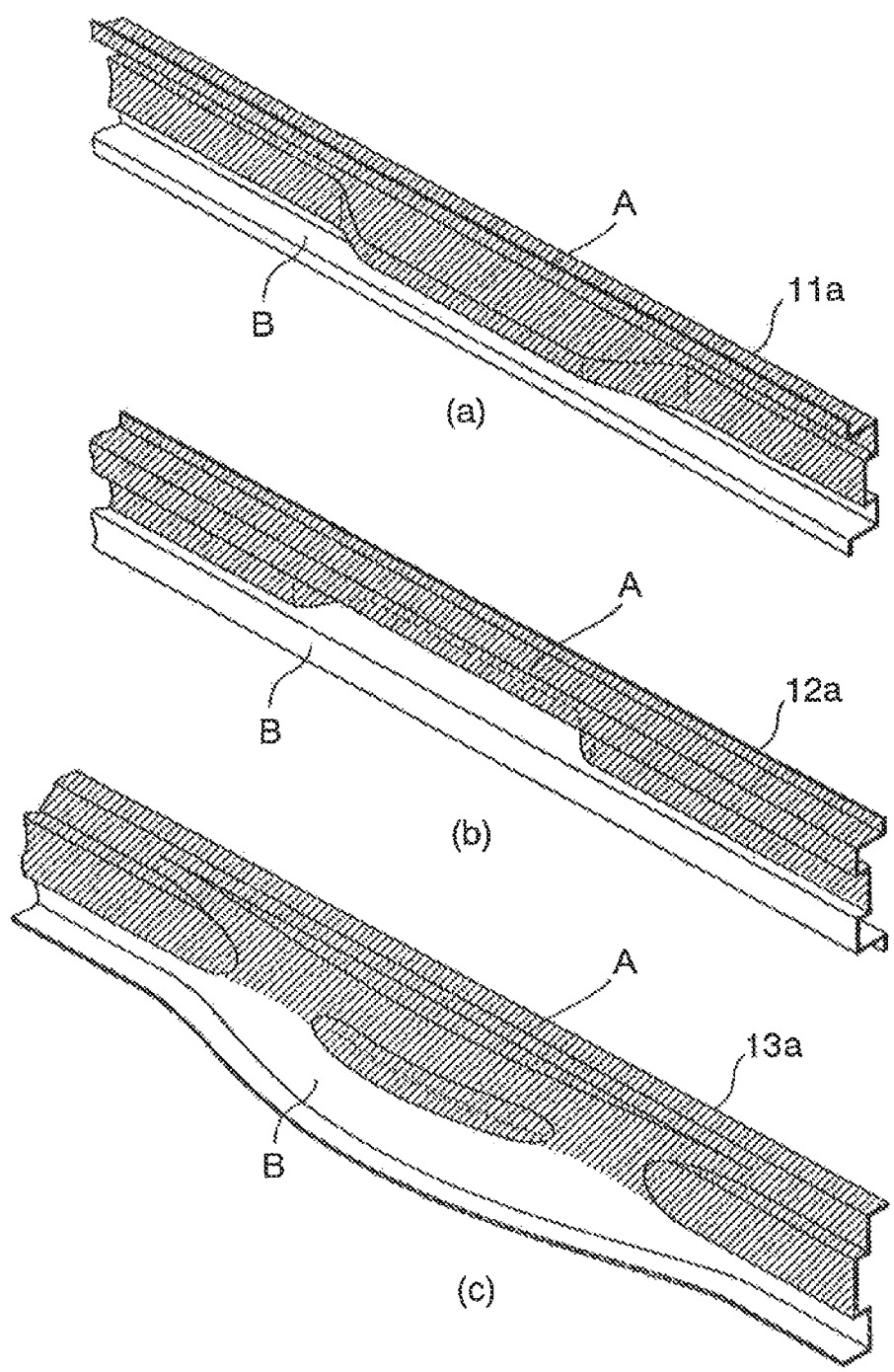
FIG. 15 is a perspective view that illustrates members that are used in a vehicle-body side part structure according to a third embodiment, in which (a) shows an outer panel, (b) shows an inner panel and (c) shows a backup panel.

FIG. 15 is a perspective view that illustrates members that are used in a vehicle-body side part structure according to a third embodiment, in which (a) shows an outer panel, (b) shows an inner panel and (c) shows a backup panel.

As shown in FIG. 15, the outer panel 11a, the inner panel 12a and the backup panel 13a that are used in the vehicle-body side part structure according to the third embodiment have varying strength in the vehicle vertical direction.

In other words, the strength of upper portions A in the vehicle vertical direction of the outer panel 11a, the inner panel 12a and the backup panel 13a is increased by, for example, a heat treatment so that the strength of the upper portions A can be higher than that of lower portions B of the inner panel 12a and the backup panel 13a that form lower portions in the vehicle vertical direction thereof.

In general, as the deformation of an upper portion in the vehicle vertical direction of a side sill increases, the amount of inward collapse of the center pillar in the vehicle width direction increases. On the other hand, when the material of a side sill is changed or the thickness of a side sill is increased to increase the strength of the side sill, the weight of the side sill increases.

Thus, by varying the strength of the outer panel 11a, the inner panel 12a and the backup panel 13a in the vehicle vertical direction as described above, it is possible to reduce the weight of the entire side sill while providing an upper portion in the vehicle vertical direction with sufficient strength.

Fourth Embodiment

Figure 16:
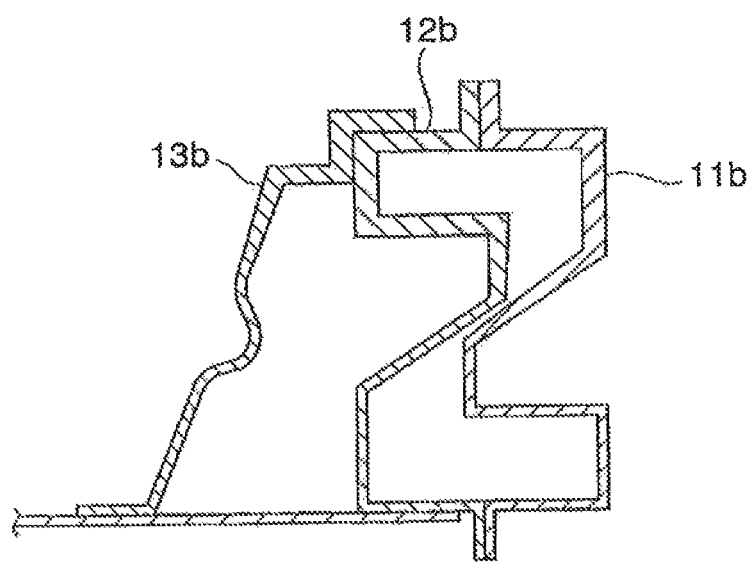
FIG. 16 is a partial cross-sectional view of a vehicle-body side part structure according to a fourth embodiment.

FIG. 16 is a partial cross-sectional view of a vehicle-body side part structure according to a fourth embodiment.

As shown in FIG. 16, an outer panel 11b, an inner panel 12b and a backup panel 13b that are used in the vehicle-body side part structure of the fourth embodiment have a varying thickness in the vehicle vertical direction.

In other words, the thickness of the outer panel 11b, the inner panel 12b and the backup panel 13b is gradually increased from a lower end edge in the vehicle vertical direction to an upper end edge in the vehicle vertical direction.

By varying the thickness of the outer panel 11b, the inner panel 12b and the backup panel 13b in the vehicle vertical direction as described above, it is possible to reduce the weight of the entire side sill while providing an upper portion in the vehicle vertical direction with sufficient strength.

While preferred embodiments of the present invention have been described in the foregoing, the present invention is not limited to the above embodiments.

For example, while various specific examples of lateral high-rigidity portion and longitudinal high-rigidity portion are described in the above embodiments, the present invention does not necessarily include all of them as long as it includes at least one of them. Also, the lateral high-rigidity portion and the longitudinal high-rigidity portion of the present invention are not limited to those that are described in the above embodiments, and may be in any form as long as the rigidity in the vehicle width direction and the vehicle longitudinal direction can be enhanced. In addition, the lateral high-rigidity portion and the longitudinal high-rigidity portion of the present invention do not have to be formed in all of the outer panel, inner panel and backup panel and may be formed in at least one of the outer panel, inner panel and backup panel.

While the backup panel 13 is described to extend from the front end in the vehicle longitudinal direction to the rear end in the vehicle longitudinal direction of the outer panel 11 and the inner panel 12, the backup panel 13 only has to extend at least from a front end portion in the vehicle longitudinal direction of the outer panel 11 and the inner panel 12 beyond the center pillar 2 toward a rear end portion in the vehicle longitudinal direction of the outer panel 11 and the inner panel 12.

While the second closed cross-sections and the third closed cross-sections are described to be formed in both end portions in the vehicle longitudinal direction in the above embodiments, a second closed cross-section and a third closed cross-section may be formed only in one end portion in the vehicle longitudinal direction. In this case, the second closed cross-section can be formed only in one end portion in the vehicle longitudinal direction when the inner panel bead end portion 44 is formed only in one end portion of the inner panel 12 in the vehicle longitudinal direction and the backup panel bead end portion 64 is formed only in one end portion of the backup panel 13 in the vehicle longitudinal direction. Also, when the backup panel end portion 74 in which the lower bead side wall portion 78 and the lower bead top wall portion 79 are formed is formed only in one end portion of the backup panel 13 in the vehicle longitudinal direction, the third closed cross-section can be formed only in one end portion in the vehicle longitudinal direction.

INDUSTRIAL APPLICABILITY

The present invention is usable in a side part structure of a vehicle in which a side sill is joined to a center pillar and a floor panel.

DESCRIPTION OF REFERENCE NUMERALS AND SYMBOLS

1: vehicle-body side part structure according to first embodiment, 2: center pillar, 3: side sill, 4: front floor cross member, 5: rear floor cross member, 6: floor panel, 11: outer panel, 11a: outer panel, 11b: outer panel, 12: inner panel, 12a: inner panel, 12b: inner panel, 13: backup panel (reinforcing member), 13a: backup panel, 13b: backup panel, 15: upper flange portion, 16: top wall portion, 17: upper side wall portion, 18: lower flange portion, 19: bottom wall portion, 20: lower side wall portion, 21: outer panel bead portion (first outer panel recessed portion), 22: outer panel bead central portion (first outer panel recessed portion), 23: outer panel bead upper wall portion, 23a: upper surface of outer panel bead upper wall portion, 24: outer panel bead lower wall portion, 25: outer panel bead bottom wall portion, 27: outer panel bead end portion, 28: outer panel bead upper wall portion, 29: outer panel bead lower wall portion, 30: outer panel bead bottom wall portion, 32: upper flange portion, 33: top wall portion, 34: upper side wall portion (side wall portion), 35: lower flange portion, 36: bottom wall portion, 37: lower side wall portion (side wall portion), 38: inner panel bead portion (first inner panel recessed portion, second inner panel recessed portion, side wall portion), 39: inner panel bead central portion (first inner panel recessed portion, side wall portion), 40: inner panel bead upper wall portion, 41: inner panel bead lower wall portion, 41a: lower surface of inner panel bead lower wall portion, 42: inner panel bead bottom wall portion, 44: inner panel bead end portion (second inner panel recessed portion), 45: inner panel bead upper wall portion, 46: inner panel bead lower wall portion, 47: inner panel bead bottom wall portion, 50: backup panel central bulging portion (bulging portion), 51: upper flange portion, 52: side wall portion, 53: large width portion, 54: upper inclined wall portion, 55: lower flange portion, 56: lower inclined wall portion, 57: backup panel bead central portion, 59: backup panel end portion, 60: upper flange portion, 61: upper side wall portion, 62: lower flange portion, 63: lower side wall portion, 64: backup panel bead end portion (first reinforcing member raised portion), 65: backup panel bead upper wall portion, 66: backup panel bead lower wall portion, 67: backup panel bead top wall portion, 71: vehicle-body side part structure according to second embodiment, 72: backup panel, 74: backup panel end portion, 75: upper flange portion, 76: upper side wall portion, 77: lower flange portion, 78: lower bead side wall portion (second reinforcing member raised portion), 79: lower bead top wall portion (second reinforcing member raised portion), 80: lower side wall portion, 82: backup panel bead end portion, 100: conventional vehicle-body side part structure, 101: side sill, 102: outer panel, 103: inner panel, A: upper portion, B: lower portion, F: load.

The invention claimed is:

1. A vehicle-body side part structure, comprising:
a side sill that includes an outer panel that is located on the outside in a vehicle width direction and extends in a vehicle longitudinal direction and an inner panel that is located on the inside in a vehicle width direction and extends in a vehicle longitudinal direction, the side sill being joined to a center pillar;

a floor panel that is joined to a lower portion in a vehicle vertical direction of the side sill; and a reinforcing member that extends from a front end portion of the side sill toward a rear end portion of the side sill beyond at least the center pillar and is joined to the inner panel and the floor panel, wherein a lateral high-rigidity portion that has an increased rigidity in the vehicle width direction is formed in a central portion in the vehicle longitudinal direction of at least one of the side sill and the reinforcing member, wherein a longitudinal high-rigidity portion that has an increased rigidity in the vehicle longitudinal direction is formed in an end portion in the vehicle longitudinal direction of at least one of the side sill and the reinforcing member, wherein a second inner panel recessed portion that is recessed outward in the vehicle width direction and extends in the vehicle longitudinal direction is formed in at least one of end portions in the vehicle longitudinal direction of the inner panel, wherein a first reinforcing member raised portion that protrudes inward in the vehicle width direction and extends in the vehicle longitudinal direction is formed in at least one of end portions in the vehicle longitudinal direction of the reinforcing member, and wherein a second closed cross-section is formed by the second inner panel recessed portion and the first reinforcing member raised portion.

2. The vehicle-body side part structure according to claim 1, wherein a first outer panel recessed portion that is recessed toward the inner panel is formed in a central portion in the vehicle longitudinal direction of the outer panel, and wherein a first inner panel recessed portion that is recessed toward the outer panel is formed in a central portion in the vehicle longitudinal direction of the inner panel.

3. The vehicle-body side part structure according to claim 2, wherein the first outer panel recessed portion and the first inner panel recessed portion are located in such locations that the first outer panel recessed portion is brought into abutting contact with the first inner panel recessed portion when the outer panel is pulled upward in the vehicle vertical direction and inward in the vehicle width direction.

4. The vehicle-body side part structure according to claim 3, wherein the first inner panel recessed portion is located above the first outer panel recessed portion in the vehicle vertical direction.

5. The vehicle-body side part structure according to claim 4, wherein an upper surface in the vehicle vertical direction of the first outer panel recessed portion is a slope that faces inward in the vehicle width direction, and wherein a lower surface in the vehicle vertical direction of the first inner panel recessed portion is a slope that faces outward in the vehicle width direction.

6. The vehicle-body side part structure according to claim 2, wherein the first outer panel recessed portion and the first inner panel recessed portion extend in the vehicle longitudinal direction with the deepest part formed in a central portion in the vehicle longitudinal direction thereof.

7. The vehicle-body side part structure according to claim 1, wherein the reinforcing member has a bulging portion that bulges inward in the vehicle width direction in a central portion in the vehicle longitudinal direction thereof, and wherein a pair of floor cross members that extend in the vehicle width direction are joined to the vicinity of both end portions in the vehicle longitudinal direction of the bulging portion of the reinforcing member.

8. The vehicle-body side part structure according to claim 7, wherein the bulging portion is inclined inward in the vehicle width direction from the location of the junction with the inner panel to the location of the junction with the floor panel.

9. The vehicle-body side part structure according to claim 1, wherein a first closed cross-section is formed by the inner panel, the reinforcing member and the floor panel.

10. The vehicle-body side part structure according to claim 1, wherein a second reinforcing member raised portion that protrudes inward in the vehicle width direction and extends in the vehicle longitudinal direction is formed in a lower end portion in the vehicle vertical direction of at least one of end portions in the vehicle longitudinal direction of the reinforcing member, and wherein a third closed cross-section is formed by the second reinforcing member raised portion, the inner panel and the floor panel.

11. The vehicle-body side part structure according to claim 1, wherein the inner panel includes an upper flange portion and a lower flange portion that are joined to the outer panel at ail upper portion and a lower portion, respectively, in the vehicle vertical direction thereof, a top wall portion that extends inward in the vehicle width direction from the upper flange portion, a bottom wall portion that extends inward in the vehicle width direction from the lower flange portion, and a side wall portion that is connected to inner end edges in the vehicle width direction of the top wall portion and the bottom wall portion, and wherein the reinforcing member is joined to the top wall portion and the side wall portion to reinforce the ridge between the top wall portion and the side wall portion.

12. The vehicle-body side part structure according to claim 1, wherein the strength of the side sill and the reinforcing portion is higher in an upper part in the vehicle vertical direction than in a lower part in the vehicle vertical direction.

* * * * *